US010862823B2

United States Patent
Zhu et al.

(10) Patent No.: US 10,862,823 B2
(45) Date of Patent: Dec. 8, 2020

(54) METHOD FOR SERVICE IMPLEMENTATION IN NETWORK FUNCTION VIRTUALIZATION (NFV) SYSTEM AND COMMUNICATIONS UNIT

(71) Applicant: Huawei Technologies Co., Ltd., Shenzhen (CN)

(72) Inventors: Lei Zhu, Beijing (CN); Anni Wei, Beijing (CN); Fang Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 15/275,054

(22) Filed: Sep. 23, 2016

(65) Prior Publication Data
US 2017/0012898 A1    Jan. 12, 2017

Related U.S. Application Data

(63) Continuation of application No. PCT/CN2014/073967, filed on Mar. 24, 2014.

(51) Int. Cl.
*H04L 12/911* (2013.01)
*H04L 12/64* (2006.01)
(Continued)

(52) U.S. Cl.
CPC .......... *H04L 47/82* (2013.01); *H04L 12/6418* (2013.01); *H04L 41/12* (2013.01);
(Continued)

(58) Field of Classification Search
CPC ..................................................... H04L 47/82
(Continued)

(56) References Cited

U.S. PATENT DOCUMENTS 6,014,678 A * 1/2000 Inoue ................... G06F 16/9558
715/206
7,111,053 B1 9/2006 Black et al.
(Continued)

FOREIGN PATENT DOCUMENTS

CN    101060466 A    10/2007
CN    101369914 A    2/2009
(Continued)

OTHER PUBLICATIONS

Briscoe et al., "Network Functions Virtualisation", 2012.*
(Continued)

*Primary Examiner* — Ondrej C Vostal
(74) *Attorney, Agent, or Firm* — Slater Matsil, LLP

(57) ABSTRACT

Embodiments provide a method, which can implement establishment of an network function virtualization (NFV) network service chain. The method includes obtaining, by a first communications unit, a service chain rule, where the service chain rule is used to indicate service processing that needs to be performed. The method also includes obtaining, according to the service chain rule, information about a service chain through which a service route passes, where the information about the service chain is used to indicate information about a virtualized network function (VNF) through which the service route passes, and the VNF is configured for the service processing; and sending a route and resource configuration request message, where the route and resource configuration request message carries the information about the service chain, to request to perform, according to the information about the service chain, route and resource configuration for the VNF included in the service chain.

15 Claims, 19 Drawing Sheets

(51) Int. Cl.
  *H04L 12/24* (2006.01)
  *H04L 12/751* (2013.01)
  *H04L 12/715* (2013.01)

(52) U.S. Cl.
  CPC .......... *H04L 41/5051* (2013.01); *H04L 45/02* (2013.01); *H04L 41/044* (2013.01); *H04L 41/5096* (2013.01); *H04L 45/64* (2013.01)

(58) Field of Classification Search
  USPC ....................................................... 709/226
  See application file for complete search history.

(56) References Cited

U.S. PATENT DOCUMENTS

| | | | |
|---|---|---|---|
| 8,825,887 B2 | 9/2014 | Jennings et al. | |
| 9,258,237 B1* | 2/2016 | Smith | H04L 12/4633 |
| 9,258,742 B1* | 2/2016 | Pianigiani | H04L 45/38 |
| 9,979,602 B1 | 5/2018 | Chinnakannan et al. | |
| 10,055,240 B2 | 8/2018 | Chastain et al. | |
| 10,057,109 B2 | 8/2018 | Shatzkamer et al. | |
| 2003/0126196 A1* | 7/2003 | Lagimonier | H04L 41/5054 |
| | | | 709/203 |
| 2004/0022379 A1 | 2/2004 | Klos et al. | |
| 2004/0078282 A1* | 4/2004 | Robinson | G06Q 30/0601 |
| | | | 705/26.1 |
| 2005/0289244 A1* | 12/2005 | Sahu | H04L 67/2819 |
| | | | 709/249 |
| 2006/0031506 A1 | 2/2006 | Redgate | |
| 2007/0130192 A1 | 6/2007 | Bolder et al. | |
| 2009/0157457 A1* | 6/2009 | Huuhtanen | G06Q 10/063 |
| | | | 705/7.11 |
| 2009/0210534 A1* | 8/2009 | O'Connell | H04L 67/14 |
| | | | 709/226 |
| 2010/0088382 A1* | 4/2010 | Lee | G06Q 10/00 |
| | | | 709/206 |
| 2010/0103905 A1 | 4/2010 | Yang | |
| 2010/0192207 A1 | 7/2010 | Raleigh | |
| 2010/0211957 A1* | 8/2010 | Lotlikar | G06F 9/5027 |
| | | | 718/104 |
| 2011/0209140 A1* | 8/2011 | Scheidel | G06F 8/61 |
| | | | 717/172 |
| 2012/0099571 A1* | 4/2012 | Staykoff | H04L 41/50 |
| | | | 370/338 |
| 2012/0147894 A1 | 6/2012 | Mulligan et al. | |
| 2012/0281540 A1* | 11/2012 | Khan | H04L 45/308 |
| | | | 370/241 |
| 2013/0103624 A1 | 4/2013 | Thieberger | |
| 2013/0124708 A1* | 5/2013 | Lee | H04L 67/16 |
| | | | 709/223 |
| 2013/0332927 A1 | 12/2013 | Tang et al. | |
| 2014/0201374 A1* | 7/2014 | Ashwood-Smith | H04L 49/70 |
| | | | 709/226 |
| 2014/0334488 A1* | 11/2014 | Guichard | H04L 45/306 |
| | | | 370/392 |
| 2014/0341029 A1* | 11/2014 | Allan | H04L 47/125 |
| | | | 370/235 |
| 2015/0003455 A1* | 1/2015 | Haddad | H04L 45/38 |
| | | | 370/392 |
| 2015/0063102 A1* | 3/2015 | Mestery | H04L 41/12 |
| | | | 370/230 |
| 2015/0124815 A1* | 5/2015 | Beliveau | H04L 45/38 |
| | | | 370/392 |
| 2015/0200838 A1* | 7/2015 | Nadeau | H04L 45/124 |
| | | | 398/58 |
| 2015/0207586 A1* | 7/2015 | Xia | H04J 14/0269 |
| | | | 398/48 |
| 2015/0326496 A1* | 11/2015 | Ramon Salguero | H04L 41/145 |
| | | | 709/226 |
| 2016/0044118 A1 | 2/2016 | Huang et al. | |
| 2016/0234104 A1* | 8/2016 | Hoffmann | H04L 41/0806 |
| 2016/0308981 A1* | 10/2016 | Cortes Gomez | H04L 67/16 |
| 2016/0328258 A1 | 11/2016 | Iwashina et al. | |
| 2016/0335111 A1* | 11/2016 | Bruun | G06F 9/45558 |
| 2016/0337189 A1* | 11/2016 | Liebhart | H04L 45/306 |
| 2016/0344637 A1* | 11/2016 | Saha | H04L 47/10 |
| 2016/0344640 A1* | 11/2016 | Soderlund | H04L 47/2483 |
| 2016/0373474 A1 | 12/2016 | Sood et al. | |
| 2017/0012898 A1* | 1/2017 | Zhu | H04L 12/6418 |
| 2017/0149632 A1* | 5/2017 | Saltsidis | H04L 41/5054 |
| 2017/0180218 A1* | 6/2017 | Rasanen | H04L 41/5041 |
| 2017/0317881 A1 | 11/2017 | Smartt et al. | |
| 2017/0346704 A1 | 11/2017 | Strijkers et al. | |
| 2017/0359265 A1 | 12/2017 | Bosch et al. | |
| 2018/0034714 A1 | 2/2018 | Zhang et al. | |
| 2018/0159801 A1 | 6/2018 | Rajan et al. | |
| 2018/0181424 A1 | 6/2018 | Gokurakuji et al. | |
| 2018/0191838 A1 | 7/2018 | Friedman et al. | |
| 2019/0089780 A1 | 3/2019 | Yousaf et al. | |

FOREIGN PATENT DOCUMENTS

| | | | |
|---|---|---|---|
| CN | 103269280 A | 8/2013 | |
| EP | 2023538 A1 | 2/2009 | |
| EP | 3116177 A1 * | 1/2017 | ......... H04L 12/6418 |
| JP | 2014158242 A | 8/2014 | |
| JP | 2015162147 A | 9/2015 | |
| WO | 2005093964 A1 | 10/2005 | |
| WO | 2014201085 A1 | 12/2014 | |
| WO | 2015099036 A1 | 7/2015 | |

OTHER PUBLICATIONS

Carella et al., "Cloudified IP Multimedia Subsystem (IMS) for Network Function Virtualization (NFV)-based architectures", Jun. 2014.*
Chiosi et al., "Network Functions Virtualisation an Introduction, Benefits, Enablers, Challenges & Call for Action", 2012.*
Chiosi et al., "Network Functions Virtualisation (NFV) Network Operator Perspectives on Industry Progress", 2013.*
ETSI, "Network Functions Virtualisation (NFV); Use Cases", ETSI GS NFV 001 v1.1.1, Oct. 2013.*
ETSI, "Network Functions Virtualisation (NFV); Architectural Framework", ETSI GS NFV 002 v1.1.1, Oct. 2013.*
ETSI, "Network Functions Virtualisation (NFV); Virtualisation Requirements", ETSI GS NFV 004 v1.1.1, Oct. 2013.*
ETSI, "Network Functions Virtualisation (NFV); Management and Orchestration" ETSI GS NFV-MAN 001 v1.1.1, Dec. 2014.*
Hawilo et al., "NFV: State of the Art, Challenges, and Implementation in Next Generation Mobile Networks (vEPC)", 2014.*
Soares et al., "Cloud4HFV: A Platform for Virtual Network Functions", 2014.*
Webopedia, "NFV—Network Functions Virtualization", 2018.*
Webopedia, "VNV—virtualized network function", 2018.*
Bonnet et al., T-Nova Consortium, "Interim Report on Orchestrator Platform Implementation", Dec. 2014 (Year: 2014).*
Boucadair et al., "Service Function Chaining: Framework & Architecture", Feb. 2014 (Year: 2014).*
Chiosi et al., "Network Functions Virtualisation—Introductory White Paper", 2012 (Year: 2012).*
Ersue, "ETSI NFV Management and Orchestration—An Overview", Proc. of 88th IETF-Meeting, 2013 (Year: 2013).*
Liu et al., "Service Function Chaining (SFU) Uses Cases", Feb. 2014 (Year: 2014).*
Microsoft Computer Dictionary, "link aggregation" p312, "logical network" p317, 5th edition, 2002 (Year: 2002).*
Quinn et al., "Service Function Chaining (SFC) Architecture", May 2014 (Year: 2014).*
Risso, "Network Functions Virtualization", 2012 (Year: 2012).*
Russell, ITU-T, "Technical Report of the Focus Group on Smart Cable Television", 2013 (Year: 2013).*
SDXcentral, "What is Network Service Chaining?", 2012-2019 (Year: 2012).*
Timm et al., "Dynamic Web Service Orchestration applied to the Device Profile for Web Services in Hierarchical Networks", 2009 (Year: 2009).*
Wikipedia, "Network function virtualization", 2019 (Year: 2019).*

(56) References Cited

OTHER PUBLICATIONS

Xu et al., "Problem Statement of Network Functions Virtualization Model", Sep. 2013 (Year: 2013).*
ETSI, "Network Functions Virtualization Architectural Framework", ETSI GS NFV 002 v1.1.1 , 2013-10 (Year: 2013).*
Merriam-Webster, "template", 2020 (Year: 2020).*
Microsoft Computer Dictionary, "template", 5th edition, 2002 (Year: 2002).*
ETSI GS NFV 001 V.1.1.1 (Oct. 2013); "Network Functions Virtualisation (NFV); Use Cases"; Spohia Antipolis Cedex—France; 50 pages.
ETSI GS NFV 002 V1.1.1 (Oct. 2013); "Network Functions Virtualisation (NFV); Architectural Framework", Sophia Antipolis Cedex , France; 21 pages.
GS NFV-MAN 001 V0.3.6 (Feb. 2014); "Network Function Virtualization (NFV) Management and Orchestration"; Spohia Antipolis Cedex—France; 136 pages.
Mijumbi, Rashid et al., "Management and Orchestration Challenges in Network Functions Virtualization," IEEE Communications Magazine, Jan. 2016, 8 pages.
Sahhaf, Sahel et al., "Scalable Architecture for Service Function Chain Orchestration," Fourth European Workshop on Software Defined Networks, 2015, 6 pages.
Soares et al., "Cloud4NFV: A Platform for Virtual Network Functions," IEEE 3rd International Conference on Cloud Networking (CloudNet), 2014, 6 pages.
Y. Chiba et al., Study on Management and Orchestration Function to Ensure Required Service Levels in NFV Environment, The Insttitute, of Electronics, Information and Communication Engineers Research Report, Feb. 2, 2017, 8 pages, vol. 113.
Japanese Office Action Translation with Japanese Office Action.

* cited by examiner

METHOD FOR SERVICE IMPLEMENTATION IN NETWORK FUNCTION VIRTUALIZATION (NFV) SYSTEM AND COMMUNICATIONS UNIT

CROSS-REFERENCE TO RELATED APPLICATIONS

This application is a continuation of International Application No. PCT/CN2014/073967, filed on Mar. 24, 2014, the disclosure of which is hereby incorporated by reference in its entirety.

TECHNICAL FIELD

The present invention relates to the communications field, and in particular, to a method for service implementation in a network function virtualization (NFV) system and a communications unit.

BACKGROUND

With development of communications technologies, a network function virtualization (NFV) technology is increasingly mature, and a related description about an NFV architecture is provided in the foreword part of the specific implementation manner part, and details are not described herein.

In an NFV multi-layer complex structure, as a virtual function entity, a virtualized network function (VNF) depends on computation, storage, and network connection capability support provided by a physical resource of an NFV infrastructure (NFVI) unit. A connection between VNFs is a logical link connection, where multiple VNFs are connected in a particular order by using a logical link, and can constitute a service chain (aka, service link or business chain) for service data processing. However, how to establish an NFV network service chain is a problem that currently needs to be resolved.

SUMMARY

Embodiments provide a method for service implementation in a network function virtualization (NFV) system and a communications unit, which can implement establishment of an NFV network service chain.

To achieve the foregoing objective, the following solutions are provided in the embodiments.

According to a first aspect, a first communications unit is provided, where the first communications unit includes a service chain rule obtaining unit, a service chain information obtaining unit, and a message sending unit, where the service chain rule obtaining unit is configured to obtain a service chain rule, where the service chain rule is used to indicate service processing that needs to be performed. The service chain information obtaining unit is configured to obtain, according to the service chain rule obtained by the service chain rule obtaining unit, information about a service chain through which a service route passes, where the information about the service chain is used to indicate information about a virtualized network function (VNF) through which the service route passes, and the VNF is configured for the service processing. Additionally, the message sending unit is configured to send a route and resource configuration request message, where the route and resource configuration request message carries the information about the service chain obtained by the service chain information obtaining unit, to request to perform, according to the information about the service chain, route and resource configuration for the VNF included in the service chain.

With reference to the first aspect, in a first possible implementation manner of the first aspect, the first communications unit further includes an information determining unit, where the information determining unit is configured to: before the service chain information obtaining unit obtains, according to the service chain rule obtained by the service chain rule obtaining unit, the information about the service chain through which the service route passes, determine whether the service chain rule includes the information about the service chain; and the service chain information obtaining unit includes: an information determining module, a message sending module, a receiving module, and a generation module, where the information determining module is configured to: if the information determining unit determines that the service chain rule does not include the information about the service chain, determine, according to the service chain rule, a type of the VNF through which the service route passes and identification information of a VNF included in each VNF type in the type of the VNF; the message sending module is configured to send a query request message, where the query request message carries the identification information, determined by the information determining module, of the VNF included in each VNF type, to request to query, according to the identification information of the VNF, first information of the VNF included in each VNF type, where the first information is used to indicate a network topology, a node capability, and a status of a network function virtualization infrastructure (NFVI); the receiving module is configured to receive the first information of the VNF included in each VNF type; and the generation module is configured to generate the information about the service chain according to the first information, received by the receiving module, of the VNF included in each VNF type.

With reference to the first possible implementation manner of the first aspect, in a second possible implementation manner of the first aspect, the service chain information obtaining unit further includes an obtaining module, where the obtaining module is configured to: if the service chain rule includes the information about the service chain, obtain the information about the service chain included in the service chain rule.

With reference to the first possible implementation manner of the first aspect or the second possible implementation manner of the first aspect, in a third possible implementation manner of the first aspect, the message sending module is configured to: send the query request message to a second communications unit, to request the second communications unit to query, according to the identification information of the VNF, the first information of the VNF included in each VNF type.

With reference to the third possible implementation manner of the first aspect, in a fourth possible implementation manner of the first aspect, the message sending module is configured to: send the query request message to a VNF manager (VNFM), to send the query request message to the second communications unit by using the VNFM.

With reference to the fourth possible implementation manner of the first aspect, in a fifth possible implementation manner of the first aspect, the message sending module is configured to: send the query request message to the VNFM, to send the query request message to a NFV orchestrator (NFVO) by using the VNFM and to send the query request message to the second communications unit by using the NFVO.

With reference to the third possible implementation manner of the first aspect, in a sixth possible implementation manner of the first aspect, the message sending module is configured to: send the query request message to an operations support system (OSS)/business support system (BSS), to send the query request message to an NFVO by using the OSS/BSS and to send the query request message to the second communications unit by using the NFVO.

With reference to the sixth possible implementation manner of the first aspect, in a seventh possible implementation manner of the first aspect, the message sending module is configured to: send the query request message to the OSS/BSS, to send the query request message to the NFVO by using the OSS/BSS, to send the query request message to a VNFM by using the NFVO, and to send the query request message to the second communications unit by using the VNFM.

With reference to the first aspect to the seventh possible implementation manner of the first aspect, in an eighth possible implementation manner of the first aspect, the message sending unit is configured to: send the route and resource configuration request message to the second communications unit, to request the second communications unit to perform the route and resource configuration.

With reference to the eighth possible implementation manner of the first aspect, in a ninth possible implementation manner of the first aspect, the message sending unit is configured to: send the route and resource configuration request message to the VNFM, to send the route and resource configuration request message to the second communications unit by using the VNFM.

With reference to the ninth possible implementation manner of the first aspect, in a tenth possible implementation manner of the first aspect, the message sending unit is configured to: send the route and resource configuration request message to the VNFM, to send the route and resource configuration request message to the NFVO by using the VNFM and to send the route and resource configuration request message to the second communications unit by using the NFVO.

With reference to the eighth possible implementation manner of the first aspect, in an eleventh possible implementation manner of the first aspect, the message sending unit is configured to: send the route and resource configuration request message to the OSS/BSS, to send the route and resource configuration request message to the NFVO by using the OSS/BSS and to send the route and resource configuration request message to the second communications unit by using the NFVO.

With reference to the eleventh possible implementation manner of the first aspect, in a twelfth possible implementation manner of the first aspect, the message sending unit is configured to: send the route and resource configuration request message to the OSS/BSS, to send the route and resource configuration request message to the NFVO by using the OSS/BSS, to send the route and resource configuration request message to the VNFM by using the NFVO, and to send the route and resource configuration request message to the second communications unit by using the VNFM.

With reference to the first aspect to the twelfth possible implementation manner of the first aspect, in a thirteenth possible implementation manner of the first aspect, the first communications unit further includes a receiving unit, where the receiving unit is configured to: if the route and resource configuration succeeds, receive information indicating that the route and resource configuration succeeds.

According to a second aspect, a second communications unit is provided, where the second communications unit includes a receiving unit and a configuration unit, where the receiving unit is configured to receive a route and resource configuration request message, where the route and resource configuration request message carries information about a service chain through which a service route passes, to request to perform, according to the information about the service chain, route and resource configuration for a VNF included in the service chain, where the information about the service chain is obtained according to a service chain rule, the service chain rule is used to indicate service processing that needs to be performed, the information about the service chain is used to indicate information about the VNF through which the service route passes, and the VNF is configured for the service processing. Additionally, the configuration unit is configured to perform, according to the information about the service chain received by the receiving unit and information about a physical resource of a network function virtualization infrastructure (NFVI), service route and resource configuration for the VNF included in the service chain.

With reference to the first aspect, in a first possible implementation manner of the second aspect, the second communications unit further includes: a query unit and a sending unit, where the receiving unit is further configured to: before receiving the route and resource configuration request message, receive a query request message, where the query request message carries identification information of a VNF included in each VNF type in a type of the VNF through which the service route passes, to request to query, according to the identification information of the VNF, first information of the VNF included in each VNF type, where the first information is used to indicate a network topology, a node capability, and a status of the NFVI; the query unit is configured to: according to the query request message received by the receiving unit, query the physical resource of the NFVI, and obtain the first information of the VNF included in each VNF type; and the sending unit is configured to send the first information, obtained by the query unit through query, of the VNF included in each VNF type, to generate the information about the service chain according to the first information of the VNF included in each VNF type.

With reference to the second aspect or the first possible implementation manner of the second aspect, in a second possible implementation manner of the second aspect, the receiving unit is configured to: receive the route and resource configuration request message sent by a VNFM.

With reference to the second aspect or the first possible implementation manner of the second aspect, in a third possible implementation manner of the second aspect, the receiving unit is configured to: receive the route and resource configuration request message sent by a VNF OSS/BSS.

With reference to the second aspect to the third possible implementation manner of the second aspect, in a fourth possible implementation manner of the second aspect, the sending unit is further configured to: if the route and resource configuration succeeds, send information indicating that the route and resource configuration succeeds.

According to a third aspect, an OSS/BSS is provided, where the OSS/BSS includes: an obtaining unit and a sending unit, where the obtaining unit is configured to obtain information about a service chain template through which a service route passes, where the service chain template information is used to indicate a correspondence between a service chain identifier and information about a service chain; and the sending unit is configured to send the service chain template information obtained by the obtaining unit to an NFV orchestrator NFVO, so that the NFVO requests, according to the service chain template information, to perform route and resource configuration for a VNF included in a service chain in the service chain template.

With reference to the third aspect, in a first possible implementation manner of the third aspect, the OSS/BSS further includes a receiving unit, where the receiving unit is configured to receive information indicating that the service chain template information has been received.

With reference to the third aspect or the first possible implementation manner of the third aspect, in a second possible implementation manner of the third aspect, the receiving unit is further configured to: if the route and resource configuration succeeds, receive information indicating that the route and resource configuration succeeds.

According to a fourth aspect, a NFVO is provided, where the NFVO includes: a receiving unit and a sending unit, where the receiving unit is configured to receive information about a service chain template through which a service route passes, where the service chain template information is used to indicate a correspondence between a service chain identifier and information about a service chain; and the sending unit is configured to send a route and resource configuration request message, where the route and resource configuration request message carries the service chain template information received by the receiving unit, to request to perform, according to the service chain template information, route and resource configuration for a VNF included in a service chain in the service chain template.

With reference to the fourth aspect, in a first possible implementation manner of the fourth aspect, the sending module is configured to: send the route and resource configuration request message to a second communications unit, to request the second communications unit to perform, according to the service chain template information, the route and resource configuration for the VNF included in the service chain in the service chain template.

With reference to the fourth aspect or the first possible implementation manner of the fourth aspect, in a second possible implementation manner of the fourth aspect, the sending unit is further configured to: after the receiving unit receives the information about the service chain template through which the service route passes, send information indicating that the service chain template information has been received.

With reference to the fourth aspect to the second possible implementation manner of the fourth aspect, in a third possible implementation manner of the fourth aspect, the receiving unit is further configured to: if the route and resource configuration succeeds, receive information indicating that the route and resource configuration succeeds.

According to a fifth aspect, a second communications unit is provided, where the second communications unit includes: a receiving unit and a configuration unit, where the receiving unit is configured to receive a route and resource configuration request message, where the route and resource configuration request message carries information about a service chain template through which a service route passes, to request to perform, according to the service chain template information, route and resource configuration for a VNF included in a service chain in the service chain template, where the service chain template information is used to indicate a correspondence between a service chain identifier and information about a service chain; and the configuration unit is configured to perform, according to the service chain template information received by the receiving unit and information about a physical resource of a NFVI, the route and resource configuration for the VNF included in the service chain in the service chain template.

With reference to the fifth aspect, in a first possible implementation manner of the fifth aspect, the receiving unit is configured to: receive the route and resource configuration request message sent by an NFV orchestrator NFVO.

With reference to the first possible implementation manner of the fifth aspect, in a second possible implementation manner of the fifth aspect, the second communications unit further includes a sending unit, where the sending unit is configured to: if the route and resource configuration succeeds, send information indicating that the route and resource configuration succeeds.

According to a sixth aspect, a method for service implementation in a NFV system is provided, where the method includes: obtaining, by a first communications unit, a service chain rule, where the service chain rule is used to indicate service processing that needs to be performed; obtaining, according to the service chain rule, information about a service chain through which a service route passes, where the information about the service chain is used to indicate information about a VNF through which the service route passes, and the VNF is configured for the service processing; and sending a route and resource configuration request message, where the route and resource configuration request message carries the information about the service chain, to request to perform, according to the information about the service chain, route and resource configuration for the VNF included in the service chain.

With reference to the sixth aspect, in a first possible implementation manner of the sixth aspect, before the obtaining, according to the service chain rule, information about a service chain through which a service route passes, the method further includes: determining whether the service chain rule includes the information about the service chain; and the obtaining, according to the service chain rule, information about a service chain through which a service route passes includes: if the service chain rule does not include the information about the service chain, determining, according to the service chain rule, a type of the VNF through which the service route passes and identification information of a VNF included in each VNF type in the type of the VNF; sending a query request message, where the query request message carries the identification information of the VNF included in each VNF type, to request to query, according to the identification information of the VNF, first information of the VNF included in each VNF type, where the first information is used to indicate a network topology, a node capability, and a status of a network function virtualization infrastructure (NFVI); receiving the first information of the VNF included in each VNF type; and generating the information about the service chain according to the first information of the VNF included in each VNF type.

With reference to the first possible implementation manner of the sixth aspect, in a second possible implementation manner of the sixth aspect, the obtaining, according to the service chain rule, information about a service chain through which a service route passes further includes: if the service chain rule includes the information about the service chain, obtaining the information about the service chain included in the service chain rule.

With reference to the first possible implementation manner of the sixth aspect or the second possible implementation manner of the sixth aspect, in a third possible implementation manner of the sixth aspect, the sending a query request message includes: sending the query request message to a second communications unit, to request the second communications unit to query, according to the identification information of the VNF, the first information of the VNF included in each VNF type.

With reference to the third possible implementation manner of the sixth aspect, in a fourth possible implementation manner of the sixth aspect, the sending the query request message to a second communications unit includes: sending the query request message to a VNFM, to send the query request message to the second communications unit by using the VNFM.

With reference to the fourth possible implementation manner of the sixth aspect, in a fifth possible implementation manner of the sixth aspect, the sending the query request message to a VNFM, to send the query request message to the second communications unit by using the VNFM includes: sending the query request message to the VNFM, to send the query request message to an NFVO by using the VNFM and to send the query request message to the second communications unit by using the NFVO.

With reference to the third possible implementation manner of the sixth aspect, in a sixth possible implementation manner of the sixth aspect, the sending the query request message to a second communications unit includes: sending the query request message to an OSS/BSS, to send the query request message to an NFVO by using the OSS/BSS and to send the query request message to the second communications unit by using the NFVO.

With reference to the sixth possible implementation manner of the sixth aspect, in a seventh possible implementation manner of the sixth aspect, the sending the query request message to an OSS/BSS, to send the query request message to an NFVO by using the OSS/BSS and to send the query request message to the second communications unit by using the NFVO includes: sending the query request message to the OSS/BSS, to send the query request message to the NFVO by using the OSS/BSS, to send the query request message to a VNFM by using the NFVO, and to send the query request message to the second communications unit by using the VNFM.

With reference to the sixth aspect to the seventh possible implementation manner of the sixth aspect, in an eighth possible implementation manner of the sixth aspect, the sending a route and resource configuration request message includes: sending the route and resource configuration request message to the second communications unit, to request the second communications unit to perform the route and resource configuration.

With reference to the eighth possible implementation manner of the sixth aspect, in a ninth possible implementation manner of the sixth aspect, the sending the route and resource configuration request message to the second communications unit includes: sending the route and resource configuration request message to the VNFM, to send the route and resource configuration request message to the second communications unit by using the VNFM.

With reference to the ninth possible implementation manner of the sixth aspect, in a tenth possible implementation manner of the sixth aspect, the sending the route and resource configuration request message to the VNFM, to send the route and resource configuration request message to the second communications unit by using the VNFM includes: sending the route and resource configuration request message to the VNFM, to send the route and resource configuration request message to the NFVO by using the VNFM and to send the route and resource configuration request message to the second communications unit by using the NFVO.

With reference to the eighth possible implementation manner of the sixth aspect, in an eleventh possible implementation manner of the sixth aspect, the sending the route and resource configuration request message to the second communications unit includes: sending the route and resource configuration request message to the OSS/BSS, to send the route and resource configuration request message to the NFVO by using the OSS/BSS and to send the route and resource configuration request message to the second communications unit by using the NFVO.

With reference to the eleventh possible implementation manner of the sixth aspect, in a twelfth possible implementation manner of the sixth aspect, the sending the route and resource configuration request message to the OSS/BSS, to send the route and resource configuration request message to the NFVO by using the OSS/BSS and to send the route and resource configuration request message to the second communications unit by using the NFVO includes: sending the route and resource configuration request message to the OSS/BSS, to send the route and resource configuration request message to the NFVO by using the OSS/BSS, to send the route and resource configuration request message to the VNFM by using the NFVO, and to send the route and resource configuration request message to the second communications unit by using the VNFM.

With reference to the sixth aspect to the twelfth possible implementation manner of the sixth aspect, in a thirteenth possible implementation manner of the sixth aspect, the method further includes: if the route and resource configuration succeeds, receiving information indicating that the route and resource configuration succeeds.

According to a seventh aspect, a method for service implementation in a NFV system is provided, where the method includes: receiving, by a second communications unit, a route and resource configuration request message, where the route and resource configuration request message carries information about a service chain through which a service route passes, to request to perform, according to the information about the service chain, route and resource configuration for a VNF included in the service chain, where the information about the service chain is obtained according to a service chain rule, the service chain rule is used to indicate service processing that needs to be performed, the information about the service chain is used to indicate information about the VNF through which the service route passes, and the VNF is configured for the service processing; and performing, according to the information about the service chain and information about a physical resource of a NFVI, service route and resource configuration for the VNF included in the service chain.

With reference to the seventh aspect, in a first possible implementation manner of the seventh aspect, before the receiving a route and resource configuration request message, the method further includes: receiving a query request message, where the query request message carries identification information of a VNF included in each VNF type in a type of the VNF through which the service route passes, to request to query, according to the identification information of the VNF, first information of the VNF included in each VNF type, where the first information is used to indicate a network topology, a node capability, and a status of the NFVI; according to the query request message, querying the physical resource of the NFVI, and obtaining the first information of the VNF included in each VNF type; and sending the first information of the VNF included in each VNF type, to generate the information about the service chain according to the first information of the VNF included in each VNF type.

With reference to the seventh aspect or the first possible implementation manner of the seventh aspect, in a second possible implementation manner of the seventh aspect, the receiving a route and resource configuration request message includes: receiving the route and resource configuration request message sent by a VNFM.

With reference to the seventh aspect or the first possible implementation manner of the seventh aspect, in a third possible implementation manner of the seventh aspect, the receiving a route and resource configuration request message includes: receiving the route and resource configuration request message sent by a VNF OSS/BSS.

With reference to the seventh aspect to the third possible implementation manner of the seventh aspect, in a fourth possible implementation manner of the seventh aspect, the method further includes: if the route and resource configuration succeeds, sending information indicating that the route and resource configuration succeeds.

According to an eighth aspect, a method for service implementation in a NFV system is provided, where the method includes: obtaining, by an OSS/BSS, information about a service chain template through which a service route passes, where the service chain template information is used to indicate a correspondence between a service chain identifier and information about a service chain; and sending the service chain template information to an NFV orchestrator NFVO, so that the NFVO requests, according to the service chain template information, to perform route and resource configuration for a VNF included in a service chain in the service chain template.

With reference to the eighth aspect, in a first possible implementation manner of the eighth aspect, the method further includes: receiving information indicating that the service chain template information has been received.

With reference to the eighth aspect or the first possible implementation manner of the eighth aspect, in a second possible implementation manner of the eighth aspect, the method further includes: if the route and resource configuration succeeds, receiving information indicating that the route and resource configuration succeeds.

According to a ninth aspect, a method for service implementation in a NFV system is provided, where the method includes: receiving, by an NFV orchestrator NFVO, information about a service chain template through which a service route passes, where the service chain template information is used to indicate a correspondence between a service chain identifier and information about a service chain; and sending a route and resource configuration request message, where the route and resource configuration request message carries the service chain template information, to request to perform, according to the service chain template information, route and resource configuration for a VNF included in a service chain in the service chain template.

With reference to the ninth aspect, in a first possible implementation manner of the ninth aspect, the sending a route and resource configuration request message includes: sending the route and resource configuration request message to a second communications unit, to request the second communications unit to perform, according to the service chain template information, the route and resource configuration for the VNF included in the service chain in the service chain template.

With reference to the ninth aspect or the first possible implementation manner of the ninth aspect, in a second possible implementation manner of the ninth aspect, after the receiving, by an NFVO, information about a service chain template through which a service route passes, the method further includes: sending information indicating that the service chain template information has been received.

With reference to the ninth aspect to the second possible implementation manner of the ninth aspect, in a third possible implementation manner of the ninth aspect, the method further includes: if the route and resource configuration succeeds, receiving information indicating that the route and resource configuration succeeds.

According to a tenth aspect, a method for service implementation in a NFV system is provided, where the method includes: receiving, by a second communications unit, a route and resource configuration request message, where the route and resource configuration request message carries information about a service chain template through which a service route passes, to request to perform, according to the service chain template information, route and resource configuration for a VNF included in a service chain in the service chain template, where the service chain template information is used to indicate a correspondence between a service chain identifier and information about a service chain; and performing, according to the information about the service chain and information about a physical resource of a NFVI, the route and resource configuration for the VNF included in the service chain in the service chain template.

With reference to the tenth aspect, in a first possible implementation manner of the tenth aspect, the receiving a route and resource configuration request message includes: receiving the route and resource configuration request message sent by an NFV orchestrator NFVO.

With reference to the tenth aspect or the first possible implementation manner of the tenth aspect, in a second possible implementation manner of the tenth aspect, the method further includes: if the route and resource configuration succeeds, sending information indicating that the route and resource configuration succeeds.

According to an eleventh aspect, a first communications unit is provided, where the first communications unit includes: a processor and a transmitter, where the processor is configured to obtain a service chain rule, where the service chain rule is used to indicate service processing that needs to be performed; the processor is further configured to obtain, according to the service chain rule, information about a service chain through which a service route passes, where the information about the service chain is used to indicate information about a VNF through which the service route passes, and the VNF is configured for the service processing; and the transmitter is configured to send a route and resource configuration request message, where the route and resource configuration request message carries the information about the service chain obtained by the processor, to request to perform, according to the information about the service chain, route and resource configuration for the VNF included in the service chain.

With reference to the eleventh aspect, in a first possible implementation manner of the eleventh aspect, the processor is further configured to: before obtaining, according to the service chain rule, the information about the service chain through which the service route passes, determine whether the service chain rule includes the information about the service chain; and the processor being further configured to obtain, according to the service chain rule, information about a service chain through which a service route passes includes: if the service chain rule does not include the information about the service chain, determining, according to the service chain rule, a type of the VNF through which the service route passes and identification information of a VNF included in each VNF type in the type of the VNF; sending a query request message, where the query request message carries the identification information of the VNF included in each VNF type, to request to query, according to the identification information of the VNF, first information of the VNF included in each VNF type, where the first information is used to indicate a network topology, a node capability, and a status of a NFVI; receiving the first information of the VNF included in each VNF type; and generating the information about the service chain according to the first information of the VNF included in each VNF type.

With reference to the first possible implementation manner of the eleventh aspect, in a second possible implementation manner of the eleventh aspect, the obtaining, by the processor according to the service chain rule, information about a service chain through which a service route passes further includes: if the service chain rule includes the information about the service chain, obtaining the information about the service chain included in the service chain rule.

With reference to the first possible implementation manner of the eleventh aspect or the second possible implementation manner of the eleventh aspect, in a third possible implementation manner of the eleventh aspect, the sending, by the processor, a query request message includes: sending the query request message to a second communications unit, to request the second communications unit to query, according to the identification information of the VNF, the first information of the VNF included in each VNF type.

With reference to the third possible implementation manner of the eleventh aspect, in a fourth possible implementation manner of the eleventh aspect, the sending, by the processor, a query request message includes: sending the query request message to a VNFM, to send the query request message to the second communications unit by using the VNFM.

With reference to the fourth possible implementation manner of the eleventh aspect, in a fifth possible implementation manner of the eleventh aspect, the sending, by the processor, a query request message includes: sending the query request message to the VNFM, to send the query request message to a NFVO by using the VNFM and to send the query request message to the second communications unit by using the NFVO.

With reference to the third possible implementation manner of the eleventh aspect, in a sixth possible implementation manner of the eleventh aspect, the sending, by the processor, a query request message includes: sending the query request message to an OSS/BSS, to send the query request message to an NFVO by using the OSS/BSS and to send the query request message to the second communications unit by using the NFVO.

With reference to the sixth possible implementation manner of the eleventh aspect, in a seventh possible implementation manner of the eleventh aspect, the sending, by the processor, a query request message includes: sending the query request message to the OSS/BSS, to send the query request message to the NFVO by using the OSS/BSS, to send the query request message to a VNFM by using the NFVO, and to send the query request message to the second communications unit by using the VNFM.

With reference to the eleventh aspect to the seventh possible implementation manner of the eleventh aspect, in an eighth possible implementation manner of the eleventh aspect, the transmitter is configured to: send the route and resource configuration request message to the second communications unit, to request the second communications unit to perform the route and resource configuration.

With reference to the eighth possible implementation manner of the eleventh aspect, in a ninth possible implementation manner of the eleventh aspect, the transmitter is configured to: send the route and resource configuration request message to the VNFM, to send the route and resource configuration request message to the second communications unit by using the VNFM.

With reference to the ninth possible implementation manner of the eleventh aspect, in a tenth possible implementation manner of the eleventh aspect, the transmitter is configured to: send the route and resource configuration request message to the VNFM, to send the route and resource configuration request message to the NFVO by using the VNFM and to send the route and resource configuration request message to the second communications unit by using the NFVO.

With reference to the eighth possible implementation manner of the eleventh aspect, in an eleventh possible implementation manner of the eleventh aspect, the transmitter is configured to: send the route and resource configuration request message to the OSS/BSS, to send the route and resource configuration request message to the NFVO by using the OSS/BSS and to send the route and resource configuration request message to the second communications unit by using the NFVO.

With reference to the eleventh possible implementation manner of the eleventh aspect, in a twelfth possible implementation manner of the eleventh aspect, the transmitter is configured to: send the route and resource configuration request message to the OSS/BSS, to send the route and resource configuration request message to the NFVO by using the OSS/BSS, to send the route and resource configuration request message to the VNFM by using the NFVO, and to send the route and resource configuration request message to the second communications unit by using the VNFM.

With reference to the eleventh aspect to the twelfth possible implementation manner of the eleventh aspect, in a thirteenth possible implementation manner of the eleventh aspect, the first communications unit further includes a receiver, where the receiver is configured to: if the route and resource configuration succeeds, receive information indicating that the route and resource configuration succeeds.

According to a twelfth aspect, a second communications unit is provided, where the second communications unit includes: a receiver and a processor, where the receiver is configured to receive a route and resource configuration request message, where the route and resource configuration request message carries information about a service chain through which a service route passes, to request to perform, according to the information about the service chain, route and resource configuration for a VNF included in the service chain, where the information about the service chain is obtained according to a service chain rule, the service chain rule is used to indicate service processing that needs to be performed, the information about the service chain is used to indicate information about the VNF through which the service route passes, and the VNF is configured for the service processing; and the processor is configured to perform, according to the information about the service chain received by the receiver and information about a physical resource of a NFVI, service route and resource configuration for the VNF included in the service chain.

With reference to the eleventh aspect, in a first possible implementation manner of the twelfth aspect, the second communications unit further includes: a transmitter, where the receiver is further configured to: before receiving the route and resource configuration request message, receive a query request message, where the query request message carries identification information of a VNF included in each VNF type in a type of the VNF through which the service route passes, to request to query, according to the identification information of the VNF, first information of the VNF included in each VNF type, where the first information is used to indicate a network topology, a node capability, and a status of the NFVI; the processor is further configured to: according to the query request message received by the receiver, query the physical resource of the NFVI, and obtain the first information of the VNF included in each VNF type; and the transmitter is configured to send the first information, obtained by the processor through query, of the VNF included in each VNF type, to generate the information about the service chain according to the first information of the VNF included in each VNF type.

With reference to the twelfth aspect or the first possible implementation manner of the twelfth aspect, in a second possible implementation manner of the twelfth aspect, the receiver is configured to: receive the route and resource configuration request message sent by a VNFM.

With reference to the twelfth aspect or the first possible implementation manner of the twelfth aspect, in a third possible implementation manner of the twelfth aspect, the receiver is configured to: receive the route and resource configuration request message sent by a VNF OSS/BSS.

With reference to the twelfth aspect to the third possible implementation manner of the twelfth aspect, in a fourth possible implementation manner of the twelfth aspect, the transmitter is further configured to: if the route and resource configuration succeeds, send information indicating that the route and resource configuration succeeds.

According to a thirteenth aspect, OSS/BSS is provided, where the OSS/BSS includes: a processor and a transmitter, where the processor is configured to obtain information about a service chain template through which a service route passes, where the service chain template information is used to indicate a correspondence between a service chain identifier and information about a service chain; and the transmitter is configured to send the service chain template information obtained by the processor to an NFV orchestrator NFVO, so that the NFVO requests, according to the service chain template information, to perform route and resource configuration for VNF included in a service chain in the service chain template.

With reference to the thirteenth aspect, in a first possible implementation manner of the thirteenth aspect, the OSS/BSS further includes a receiver, where the receiver is configured to receive information indicating that the service chain template information has been received.

With reference to the thirteenth aspect or the first possible implementation manner of the thirteenth aspect, in a second possible implementation manner of the thirteenth aspect, the receiver is further configured to: if the route and resource configuration succeeds, receive information indicating that the route and resource configuration succeeds.

According to a fourteenth aspect, a NFVO is provided, where the NFVO includes: a receiver and a transmitter, where the receiver is configured to receive information about a service chain template through which a service route passes, where the service chain template information is used to indicate a correspondence between a service chain identifier and information about a service chain; and the transmitter is configured to send a route and resource configuration request message, where the route and resource configuration request message carries the service chain template information received by the receiver, to request to perform, according to the service chain template information, route and resource configuration for a VNF included in a service chain in the service chain template.

With reference to the fourteenth aspect, in a first possible implementation manner of the fourteenth aspect, the transmitter is configured to: send the route and resource configuration request message to a second communications unit, to request the second communications unit to perform, according to the service chain template information, the route and resource configuration for the VNF included in the service chain in the service chain template.

With reference to the fourteenth aspect or the first possible implementation manner of the fourteenth aspect, in a second possible implementation manner of the fourteenth aspect, the transmitter is further configured to: after the receiver receives the information about the service chain template through which the service route passes, send information indicating that the service chain template information has been received.

With reference to the fourteenth aspect to the second possible implementation manner of the fourteenth aspect, in a third possible implementation manner of the fourteenth aspect, the receiver is further configured to: if the route and resource configuration succeeds, receive information indicating that the route and resource configuration succeeds.

According to a fifteenth aspect, a second communications unit is provided, where the second communications unit includes: a receiver and a processor, where the receiver is configured to receive a route and resource configuration request message, where the route and resource configuration request message carries information about a service chain template through which a service route passes, to request to perform, according to the service chain template information, route and resource configuration for a VNF included in a service chain in the service chain template, where the service chain template information is used to indicate a correspondence between a service chain identifier and information about a service chain; and the processor is configured to perform, according to the service chain template information received by the receiver and information about a physical resource of a NFVI, the route and resource configuration for the VNF included in the service chain in the service chain template.

With reference to the fifteenth aspect, in a first possible implementation manner of the fifteenth aspect, the receiver is configured to: receive the route and resource configuration request message sent by an NFV orchestrator NFVO.

With reference to the first possible implementation manner of the fifteenth aspect, in a second possible implementation manner of the fifteenth aspect, the second communications unit further includes a transmitter, where the transmitter is configured to: if the route and resource configuration succeeds, send information indicating that the route and resource configuration succeeds.

The embodiments provide a method for service implementation in an NFV system and a communications unit.

Based on the foregoing technical solutions, after obtaining a service chain rule, a first communications unit can obtain, according to the service chain rule, information about a service chain through which a service route passes, and then send a route and configuration request message that carries the information about the service chain, to request to perform route and resource configuration according to the information about the service chain, implementing a function of obtaining upper-layer information about a service chain and guiding route and resource configuration of an NFVI by using the upper-layer information about a service chain, and implementing establishment of an NFV network service chain; or an OSS/BSS can obtain information about a service chain template through which a service route passes, and then send the service chain template information to an NFVO, and the NFVO requests route and resource configuration according to the service chain template information, implementing a function of obtaining upper-layer information about a service chain and guiding route and resource configuration of an NFVI by using the upper-layer information about a service chain, and implementing establishment of an NFV network service chain.

BRIEF DESCRIPTION OF THE DRAWINGS

To describe the technical solutions in the embodiments more clearly, the following briefly describes the accompanying drawings required for describing the embodiments or the prior art. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

Figure 1:
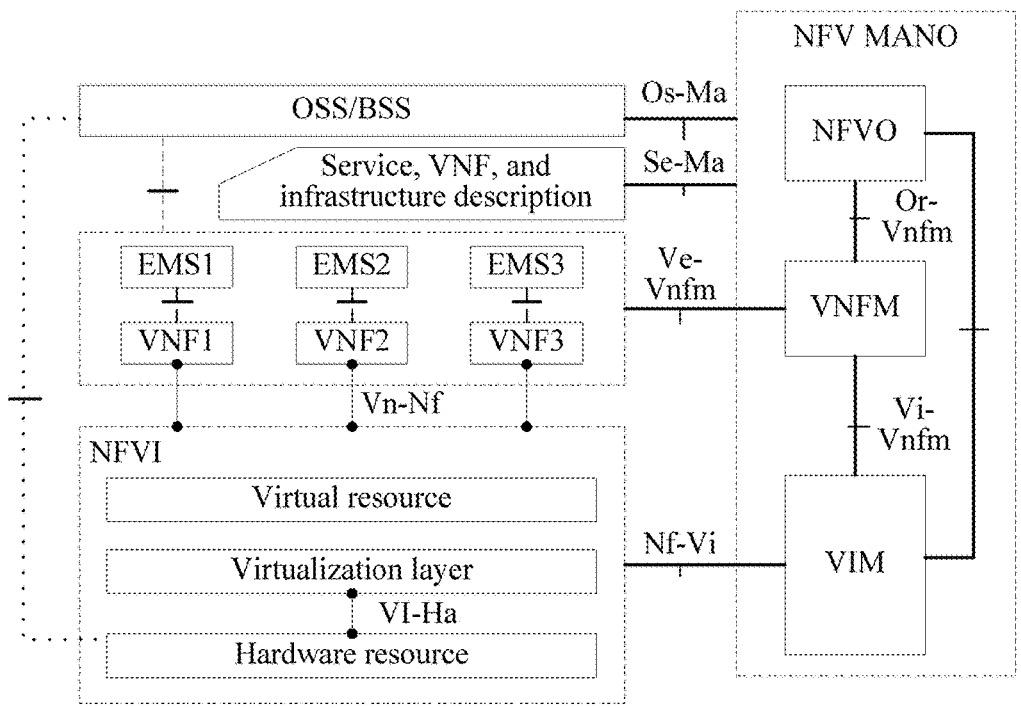
FIG. 1 is a schematic diagram of a network function virtualization (NFV) architecture according to an embodiment.

For ease of understanding, a network function virtualization (NFV) architecture is first described. As shown in FIG. 1, functional units in the architecture include:

(1) Virtualized network function (VNF) unit: Correspond to a physical network function (PNF) in a conventional non-virtualized network. For example, the VNF unit may be a virtualized evolved packet core (EPC) node, a mobility management entity (MME), a serving gateway (SGW), a packet data network-gateway (PGW), or the like). The VNF and the PNF have a same functional behavior and external interface.

(2) Element management system (EMS) unit: Perform a fault management, configuration management, accounting management, performance management, security management (Fault Management, Configuration Management, Accounting Management, Performance Management, Security Management, (FCAPS)) function for the VNF.

(3) NFV infrastructure (NFVI) unit: The NFVI includes a hardware resource, a virtual resource, and a virtualization layer.

The virtual resource refers to a resource that is simulated by using software and that has a hardware system function. The virtualization layer refers to a virtual host platform having an advanced resource management function.

Generally, a combination of the virtualization layer and the hardware resource is an entity that can provide a required virtual resource to the VNF.

(4) Virtualized infrastructure management (VIM) unit: Include a virtualized entity configured to control and manage computation and storage of a virtual network resource and the virtual network resource.

(5) NFV orchestrator (NFVO): Responsible for orchestrating and managing an NFV resource (including NFVI and VNF resources), and implementing an NFV service topology on the NFVI.

(6) VNF manager (VNFM) unit: Responsible for life cycle management of a VNF instance.

(7) Operations support system/business support system (OSS/BSS): Refer to an integrated and resource information sharing support system of a telecommunications operator, and mainly include parts such as network management, system management, charging, business, account, and customer service.

The NFVO, the VNFM, and the VIM together form an NFV management and network orchestration (NFV Management and network Orchestration, (NFV MANO)) architecture.

A configuration file in the NFV architecture shown in FIG. 1 includes: service, VNF, and infrastructure description, providing VNF connection related information, service related information, and VNF and NFVI information models.

Interfaces in the NFV architecture shown in FIG. 1 include.

(1) VI-Ha interface between the virtualization layer and the hardware resource: The virtualization layer may request, by using the interface, the hardware resource to collect related hardware resource status information.

(2) Vn-Nf interface between the VNF and the NFVI: Describe an execution environment provided by the NFVI to the VNF.

(3) Or-Vnfm interface between the NFVO and the VNFM: An internal interface in the NFV MANO.

Function 1: The VNFM sends a resource related request to the NFVO, for example, resource authorization, authentication, reservation, and allocation, for VNF life cycle management.

Function 2: The NFVO sends configuration information to the VNFM, so that the VNF can be appropriately configured according to a VNF forwarding graph.

Function 3: Collect VNF status information for VNF life cycle management.

(4) Vi-Vnfm interface between the VIM and the VNFM: An internal interface in the NFV MANO.

Function 1: The VNFM sends a resource allocation request.

Function 2: Configure a virtual hardware resource and a route and exchange status information (for example, events).

(5) Or-Vi interface between the NFVO and the VIM: An internal interface in the NFV MANO.

Function 1: The NFVO sends a resource reservation request.

Function 2: The NFVO sends a resource allocation request.

Function 3: Configure a virtual hardware resource and a route and exchange status information (for example, events).

(6) Nf-Vi interface between the NFVI and the VIM.

Function 1: Allocate a particular resource according to a resource allocation request.

Function 2: Forward virtual resource status information.

Function 3: Configure a virtual hardware resource and a route and exchange status information (for example, events).

(7) Os-Ma interface between the OSS/BSS and the NFVO.

Function 1: Request service life cycle management.

Function 2: Request VNF life cycle management.

Function 3: Forward NFV related status information.

Function 4: Exchange policy management information.

Function 5: Exchange data analysis information.

Function 6: Forward NFV related charging and use records.

Function 7: Exchange capacity and stock information.

(8) Ve-Vnfm interface between the VNF/EMS and the VNFM.

Function 1: Request VNF life cycle management.

Function 2: Exchange configuration information.

Exchange status information required by service life cycle management.

(9) Se-Ma interface between the service, VNF, and infrastructure description and the NFV MANO: The interface is configured to retrieve VNF forwarding graph related information, service related information, VNF related information, and NFVI information model related information, and provide the information to the NFV MANO for use.

Figure 2:
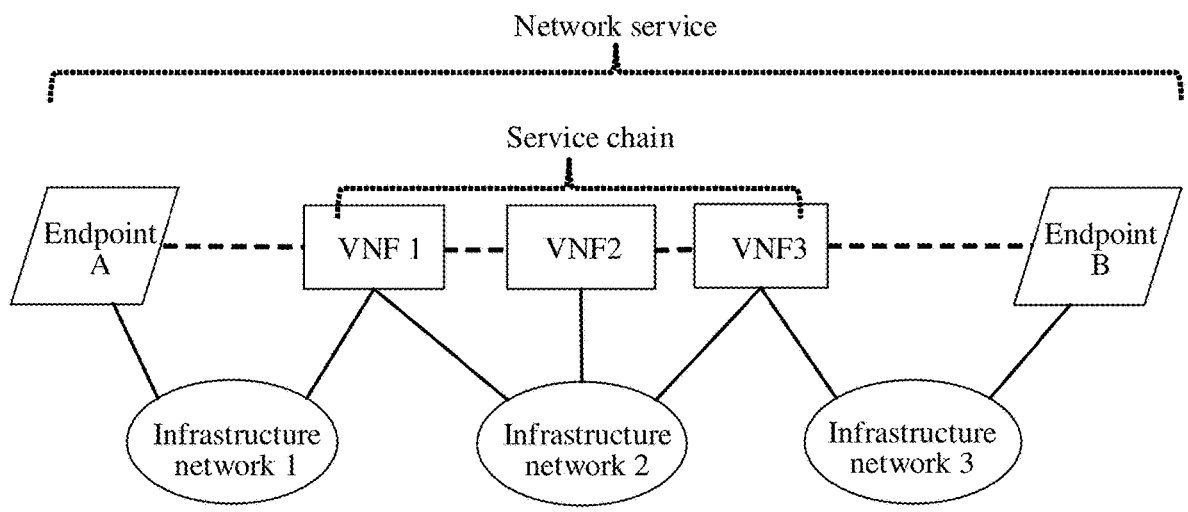
FIG. 2 is a schematic diagram of a service chain of a network service according to an embodiment.

Next, a schematic diagram of a service chain of a network service is provided herein, as shown in FIG. 2. The service chain includes two endpoints (endpoint A and endpoint B), three VNFs (VNF1, VNF2, and VNF3), and three infrastructure networks (infrastructure network 1, infrastructure network 2, and infrastructure network 3), where infrastructure network 1 provides a link connection between endpoint A and VNF1, infrastructure network 3 provides a link connection between VNF3 and endpoint B, infrastructure network 2 provides a link connection between VNF1, VNF2, and VNF3, and VNF1, VNF2, and VNF3 are strung by using a logical link provided by infrastructure network 2 and form an integrated network function, that is, a service chain for implementing a particular function. In FIG. 2, a dashed line represents a logical connection, and a solid line represents a physical connection.

The following describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope.

Embodiment 1

Figure 3:
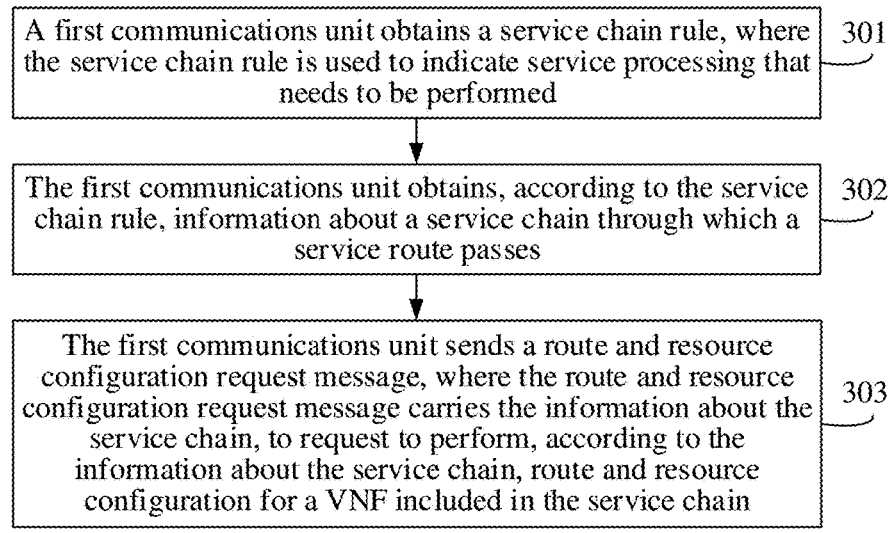
FIG. 3 shows a method for service implementation in an NFV system according to an embodiment.

This embodiment provides a method for service implementation in an NFV system. As shown in FIG. 3, the method includes:

301: A first communications unit obtains a service chain rule, where the service chain rule is used to indicate service processing that needs to be performed.

The first communications unit that executes this embodiment may be a service chain controller, or may be a network node such as a PGW, a policy and charging rules function entity (PCRF), a traffic detection entity (TDF), or a traffic classifier, which is not limited in this embodiment. The network node such as the PGW, the PCRF, the TDF, or the traffic classifier may be a VNF unit, or may be a PNF unit, which is not limited in this embodiment.

The service chain controller is a controller configured to control a service chain. The service chain controller is essentially a software-defined networking (SDN) controller. The SDN controller implements lower-layer device routing and data forwarding control by using the OpenFlow protocol. A method for lower-layer device routing and data forwarding control belongs to an existing technical solution. Details are not described herein.

It should be noted that, the service chain controller may be a gigabit internet (GI) local area network (LAN) controller, configured to control a service chain of a GI LAN network. The GI LAN refers to a network from a wireless GI interface to the Internet, and includes different service functions (SF). One service chain includes multiple SFs, one service chain corresponds to one service package, and one service package may include multiple service chains.

Certainly, the service chain controller may be a service chain controller that controls another network, which is not limited in this embodiment.

In this embodiment, the service chain rule is used to indicate the service processing that needs to be performed, and may include: a service route policy, for example, video optimization.

It should be noted that the service route policy is generally represented by using a service route policy table, and the first communications unit may determine the service route policy by querying the service route policy table.

Exemplarily, the service route policy table may be shown in FIG. 1:

TABLE 1

| | |
|---|---|
| Video service acceleration | Transmission control protoco l(Transmission Control Protocol, TCP) proxy (TCP proxy)->video cache (Video Cache)->network address translation (Network Address Translation, NAT) |
| Browser service acceleration | TCP proxy→Cache |
| ... | ... |

Alternatively, the service chain rule may further include: a logical unit through which a service route passes, for example, types of VNFs through which video optimization needs to pass: TCP proxy->Video Cache->NAT; or information about a service chain, for example, VNF7->VNF2->VNF3.

The service chain rule is not limited in this embodiment.

302: The first communications unit obtains, according to the service chain rule, information about a service chain through which a service route passes.

The information about the service chain is used to indicate information about a VNF through which a service route passes, and the VNF is configured for the service processing.

As described in step 301, the service chain rule may directly include information about a service chain, or may not include information about a service chain. Therefore, before the obtaining, by the first communications unit according to the service chain rule, information about a service chain through which a service route passes, the method may further include: determining whether the service chain rule includes the information about the service chain.

If the service chain rule includes the information about the service chain, the first communications unit may directly obtain the information about the service chain included in the service chain rule.

If the service chain rule does not include the information about the service chain, the first communications unit may obtain the information about the service chain in the following manner: determining, according to the service chain rule, a type of the VNF through which the service route passes and identification information of a VNF included in each VNF type in the type of the VNF; sending a query request message, where the query request message carries the identification information of the VNF included in each VNF type, to request to query, according to the identification information of the VNF, first information of the VNF included in each VNF type, where the first information is used to indicate a network topology, a node capability, and a status of an NFVI; receiving the first information of the VNF included in each VNF type; and generating the information about the service chain according to the first information of the VNF included in each VNF type.

It should be noted that, in this embodiment, the information about the service chain may be a service chain indicated by VNF7->VNF2->VNF3, or may be information that represents the service chain, for example, the information about the service chain may include information about the VNFs forming the service chain, or may include a service stream identifier, which is not limited in this embodiment.

It should be noted that, in this embodiment, as described in step 301, the first communications unit may be a VNF unit, or may be a PNF unit.

When the first communications unit is a VNF unit, the first communications unit may directly send the query request message to a VNFM, to send the query request message to a second communications unit by using the VNFM; or may directly send the query request message to an OSS/BSS, to send the query request message to a second communications unit by using the OSS/BSS, which is not limited in this embodiment of.

When the first communications unit is a PNF unit, the first communications unit can only directly send the query request message to an OSS/BSS, to send the query request message to a second communications unit by using the OSS/BSS, and cannot directly send the query request message to a VNFM.

The second communications unit may be a VIM, or may be an NFVI controller, which is not limited in this embodiment. For a related description of the NFVI controller, refer to the part of step 501 in Embodiment 2. Details are not described herein.

Certainly, there may be another method of obtaining, according to the service chain rule, information about a service chain through which a service route passes, which is not limited in this embodiment.

It should be noted that, when the service chain rule includes the information about the service chain, the first communications unit may also query, by using the second communications unit, first information of the VNF included in the service chain, to determine whether a state of the VNF included in the service chain is abnormal. When the second communications unit obtains through query that a state of a VNF included in the service chain is abnormal (for example, resource load exceeds a preset threshold), the second communications unit feeds back abnormality information to the first communications unit in time, so that the first communications unit feeds back the abnormality information to an entity that sends the service chain rule, and the entity that sends the service chain rule then performs corresponding processing according to a corresponding policy, for example, re-sends information about a service chain. Whether the first information of the VNF included in the service chain needs to be queried by using the second communications unit when the service chain rule includes the information about the service chain is not limited in this embodiment.

303: The first communications unit sends a route and resource configuration request message, where the route and resource configuration request message carries the information about the service chain, to request to perform, according to the information about the service chain, route and resource configuration for a VNF included in the service chain.

As described in step 301, the first communications unit may be a VNF unit, or may be a PNF unit.

When the first communications unit is a VNF unit, the first communications unit may directly send the route and resource configuration request message to the VNFM, to send the route and resource configuration request message to the second communications unit by using the VNFM; or may directly send the route and resource configuration request message to the OSS/BSS, to send the route and resource configuration request message to the second communications unit by using the OSS/BSS, which is not limited in this embodiment.

When the first communications unit is a PNF unit, the first communications unit can only directly send the route and resource configuration request message to the OSS/BSS, to send the route and resource configuration request message to the second communications unit by using the OSS/BSS, and cannot directly send the query request message to the VNFM.

As described above, the second communications unit may be a VIM, or may be an NFVI controller, which is not limited in this embodiment.

Certainly, if the route and resource configuration succeeds, the first communications unit may further receive information indicating that the route and resource configuration succeeds, which is not limited in this embodiment.

Figure 4:
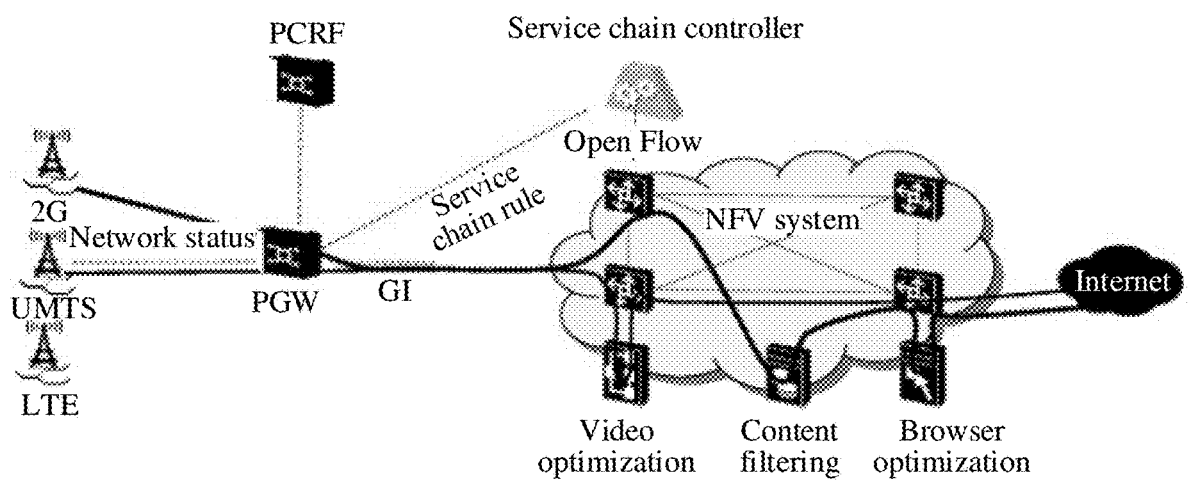
FIG. 4 is a schematic diagram of a scenario of a method for service implementation in an NFV system according to an embodiment.

In conclusion, exemplarily, it is assumed that the first communications unit that executes this embodiment is a service chain controller, and a schematic diagram of a scenario of a method for service implementation in an NFV system is provided herein, as shown in FIG. 4, including: a PCRF, a PGW, a service chain controller, an NFV system, and a network that can be supported, where the NFV system includes multiple VNF types, for example, video optimization, content filtering, and browser optimization, each VNF type includes one or more VNFs; a network that can be supported is a 2rd Generation (2G) network, or a Universal Mobile Telecommunications System (UMTS) network, or a Long Term Evolution (LTE) network.

In FIG. 4, a 3rd Generation Partnership Project (3rd Generation Partnership Project, 3GPP) network element such as the PCRF serves as a service chain rule decision entity. After deciding a service chain rule according to user information, service information, and network information, the PCRF notifies the service chain controller, so that the service chain controller obtains the service chain rule, where information exchange and service chain rule transfer are performed between the service chain controller and a wireless network node (for example, the PCRF or the PGW) by using the Diameter protocol.

The service chain controller functions to obtain service chain rule, and obtain, according to the service chain rule, information about a service chain through which a service route passes. In a possible implementation manner, if the service chain rule includes the information about the service chain, the service chain controller may directly obtain the information about the service chain included in the service chain rule. If the service chain rule does not include the information about the service chain, the service chain controller instructs an NFV MANO to query information such as the network topology of the NFVI and a resource status, and generates the information about the service chain according to the information such as the network topology of the NFVI and the resource status. After obtaining the information about the service chain, the service chain controller may instruct a VIM or an NFVI controller to perform route and resource configuration. The service chain controller serves as a VNF, and information exchange may be performed between the VNF and a VNFM by using the RESTful protocol.

Based on the method for service implementation in an NFV system provided in this embodiment, after obtaining a service chain rule, a first communications unit can obtain, according to the service chain rule, information about a service chain through which a service route passes, and then send a route and configuration request message that carries the information about the service chain, to request to perform, according to the information about the service chain, route and resource configuration for a VNF included in the service chain, implementing a function of obtaining upper-layer information about a service chain and guiding route and resource configuration of an NFVI by using the upper-layer information about a service chain, and implementing establishment of an NFV network service chain.

Embodiment 2

Figure 5:
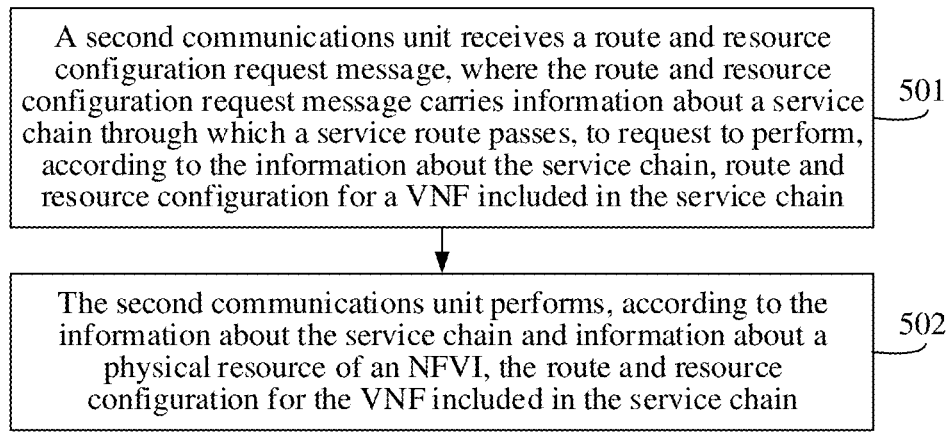
FIG. 5 shows a method for service implementation in an NFV system according to an embodiment.

This embodiment provides a method for service implementation in an NFV system. As shown in FIG. 5, the method includes.

501: A second communications unit receives a route and resource configuration request message, where the route and resource configuration request message carries information about a service chain through which a service route passes, to request to perform, according to the information about the service chain, route and resource configuration for a VNF included in the service chain.

The information about the service chain is obtained according to a service chain rule, the service chain rule is used to indicate service processing that needs to be performed, the information about the service chain is used to indicate information about the VNF through which the service route passes, and the VNF is configured for the service processing.

The second communications unit that executes this embodiment may be a VIM, or may be an NFVI controller, which is not limited in this embodiment. The NFVI controller is similar to a service chain controller, and essentially is also an SDN controller, the service chain controller controls logic and routing of a VNF at a VNF layer, and the NFVI controller controls connection and routing of a physical resource of an NFVI. The NFVI controller may be deployed in a VIM or the NFVI, or may be deployed independently, which is not limited in this embodiment.

It should be noted that, if there is an NFVI controller, because the NFVI controller may be deployed in a VIM, or may be deployed independently, in this embodiment, in a case in which there is an NFVI controller and the NFVI controller is deployed in a VIM, it is considered that the second communications unit is the VIM; in a case in which there is an NFVI controller and the NFVI controller is deployed in the NFVI or deployed independently, it may be considered that the second communications unit is the NFVI controller; and if there is no NFVI controller, the second communications unit that executes this embodiment is a VIM.

Figure 6:
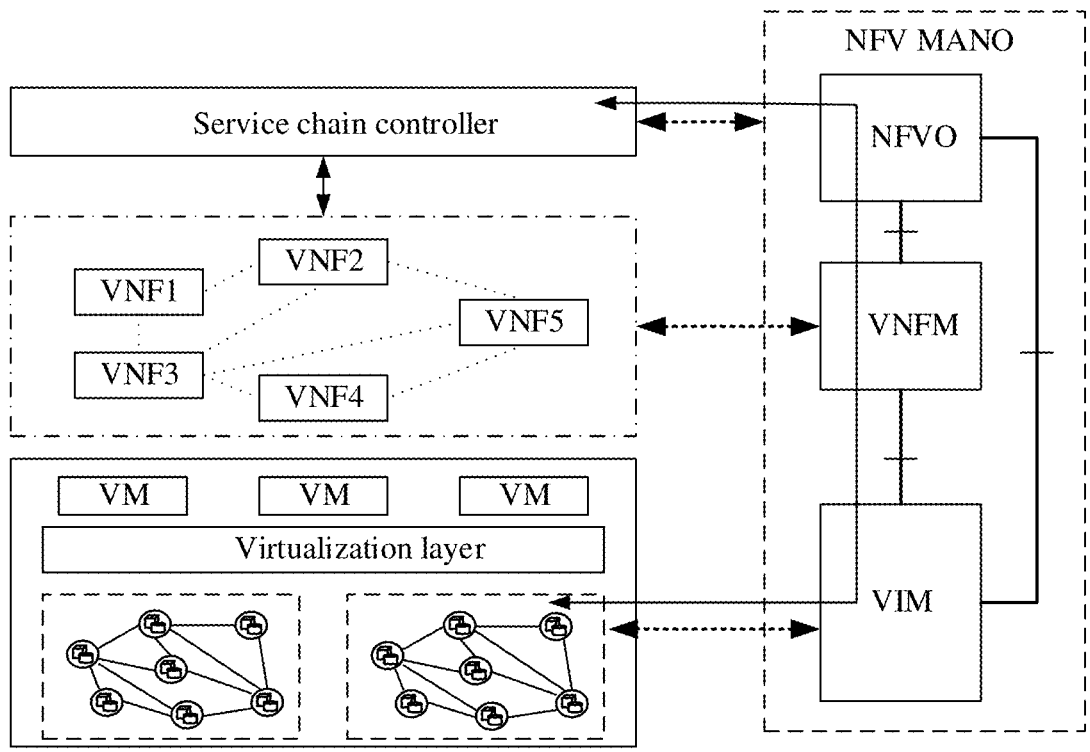
FIG. 6 is a schematic diagram of service management of an NFV system according to an embodiment.

Exemplarily, assuming that there is no NFVI controller, a schematic diagram of service management of an NFV system that is shown in FIG. 6 may be obtained, where the right side shows an NFV MANO architecture, and details are not repeated herein. The service chain controller controls the logic and routing of the VNF at the VNF layer, the VIM manages the connection and routing of the physical resource of the NFVI, and a virtual machine (Virtual Machine, VM) is configured to carry a virtual resource.

Figure 7:
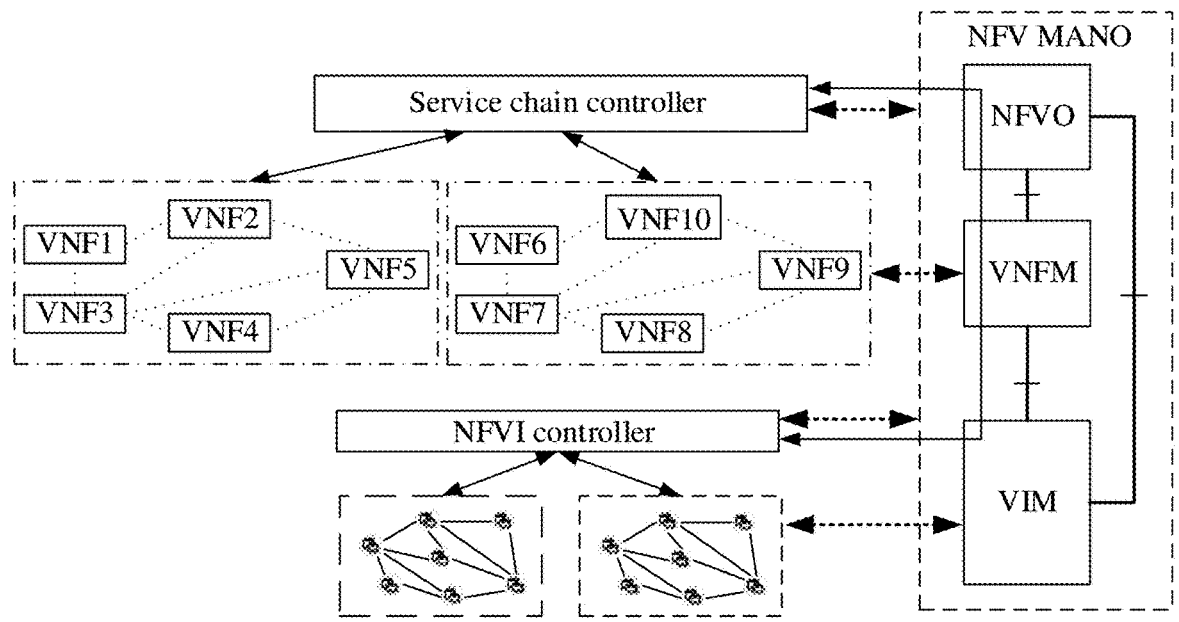
FIG. 7 is a schematic diagram of service management of another NFV system according to an embodiment.

Exemplarily, assuming that there is an NFVI controller, a schematic diagram of service management of an NFV system that is shown in FIG. 7 may be obtained, where the right side shows an NFV MANO architecture, and details are not repeated herein. A service chain controller controls logic and routing of a VNF at a VNF layer, the NFVI controller manages connection and routing of a physical resource of the NFVI, and a VM is configured to carry a virtual resource.

In this embodiment, the route and resource configuration request message received by the second communications unit may be sent by a VNFM, or may be sent by an OSS/BSS, which is not limited in this embodiment.

502: The second communications unit performs, according to the information about the service chain and information about a physical resource of an NFVI, the route and resource configuration for the VNF included in the service chain.

In this embodiment, after receiving the route and resource configuration request message, the second communications unit may perform, according to the carried information about a service chain and the information about the physical resource of the NFVI by using the following method, the route and resource configuration for the VNF included in the service chain:

After obtaining the information about the service chain, the second communications unit separately determines, according to the carried information about a service chain and the information about the physical resource of the NFVI, a routing device of the NFVI that corresponds to the VNF included in the service chain, and then separately sends a service route information table to the routing device of the NFVI that corresponds to the VNF, and the routing device of the NFVI forwards a corresponding service stream according to the service route information table.

Exemplarily, assuming that the information about the service chain is: VNF7->VNF2->VNF3, a service route information table shown in a case 1 or a case 2 may be sent to a routing device corresponding to VNF7.

Case 1:
service chain identifier: VNF7->VNF2->VNF3;
VNF7 interface: interface 1; and
VNF2 interface: interface 2.
Case 2:
service chain identifier: VNF7->VNF2;
VNF7 interface: interface 1; and
VNF2 interface: interface 2.

The service chain identifier in the case 1 includes information about an entire service chain, and the service chain identifier in the case 2 includes information only about a next hop.

Subsequently, the routing device of VNF7 forwards a corresponding service stream according to a delivered service route information table. For example, according to the service route information tables provided in the two cases, a service stream is output from an output interface 1 of the routing device of VNF7, and input from an input interface 2 of a routing device of VNF2.

Figure 8:
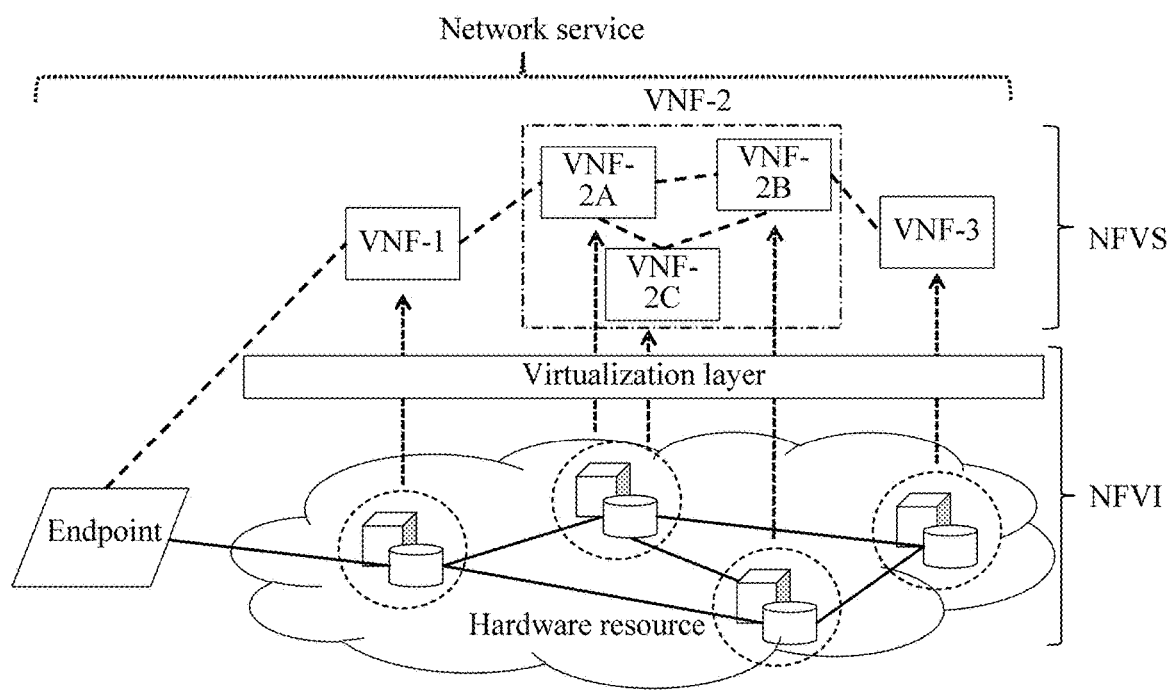
FIG. 8 is a schematic diagram of a correspondence between a virtualized network function (VNF) and a routing device of an NFV interface (NFVI) according to an embodiment.

It should be noted that, a correspondence shown in FIG. 8 exists between VNFs managed by the first communications unit and routing devices of the NFVI, that is, in hardware resources of the NFVI, the VNFs managed by the first communications unit all have routing devices corresponding to the VNFs.

It should be noted that, in this embodiment, the information about the service chain carried in the resource and configuration request message may be directly included in the service chain rule obtained by the first communications unit, or may be obtained after information about a physical resource managed by the second communications unit is queried according to the service chain rule obtained by the first communications unit. Therefore, the method for service implementation in an NFV system provided in this embodiment may further include: receiving a query request message, where the query request message carries identification information of a VNF included in each VNF type in a type of the VNF through which the service route passes, to request to query, according to the identification information of the VNF, first information of the VNF included in each VNF type, where the first information is used to indicate a network topology, a node capability, and a status of the NFVI; according to the query request message, querying the physical resource of the NFVI, and obtaining the first information of the VNF included in each VNF type; and sending the first information of the VNF included in each VNF type, to generate the information about the service chain according to the first information of the VNF included in each VNF type.

The query request message received by the second communications unit may be sent by the VNFM, or may be sent by the OSS/BSS, which is not limited in this embodiment.

Certainly, if the route and resource configuration succeeds, the second communications unit may further send information indicating that the route and resource configuration succeeds, which is not limited in this embodiment.

Based on the method for service implementation in an NFV system provided in this embodiment, a second communications unit can receive a route and resource configuration request message, where the route and resource configuration request message carries information about a service chain through which a service route passes, to request to perform, according to the information about the service chain, route and resource configuration for a VNF included in the service chain; and then perform, according to the information about the service chain and information about a physical resource of an NFVI, service route and resource configuration for the VNF included in the service chain, implementing a function of obtaining upper-layer information about a service chain and guiding route and resource configuration of the NFVI by using the upper-layer information about a service chain, and implementing establishment of an NFV network service chain.

Embodiment 3

Figure 9:
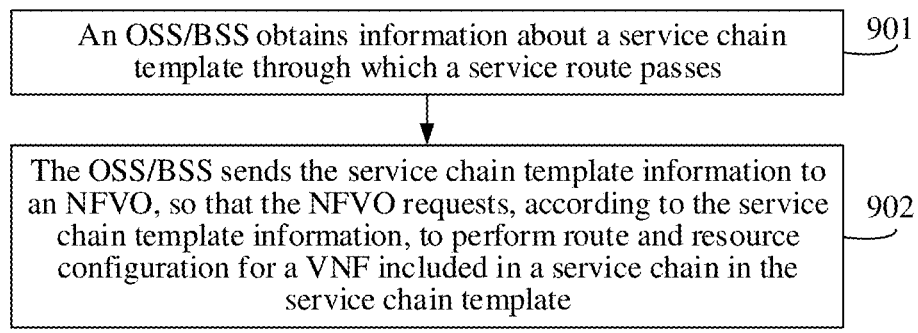
FIG. 9 shows a method for service implementation in an NFV system according to an embodiment.

This embodiment provides a method for service implementation in an NFV system. As shown in FIG. 9, the method includes.

901: An OSS/BSS obtains information about a service chain template through which a service route passes.

The service chain template information is used to indicate a correspondence between a service chain identifier and information about a service chain.

In this embodiment, the OSS/BSS may generate and maintain information about service chain templates through which service routes of all services pass, and in a process of service implementation in an NFV system, the OSS/BSS may first obtain the service chain template information, where the service chain template information is used to indicate a correspondence between a service chain identifier and information about a service chain.

In this embodiment, the service chain template information may include information such as a service chain identifier and a sequence of VNFs corresponding to a service chain, which is not limited in this embodiment.

Exemplarily, the service chain template information may be shown in Table 2:

TABLE 2

| service chain identifier | service chain |
|---|---|
| 1 | $VNF_7 \rightarrow VNF_2 \rightarrow VNF_3 \rightarrow VNF6$ |
| 2 | $VNF_1 \rightarrow VNF_7 \rightarrow VNF_3$ |
| 3 | $VNF\ 6 \rightarrow VNF_4 \rightarrow VNF_2 \rightarrow VNF_5$ |
| ... | ... |

It should be noted that, the service chain template may be stored in a network service description (NSD) or a VNF description (VNFD), or may be independent of an NSD and a VNFD, which is not limited in this embodiment.

902: The OSS/BSS sends the service chain template information to an NFVO, so that the NFVO requests, according to the service chain template information, to perform route and resource configuration for a VNF included in a service chain in the service chain template.

In this embodiment, after obtaining the service chain template information, the OSS/BSS may send the service chain template information to an NFVO, and the NFVO requests, according to the service chain template information, to perform route and resource configuration for a VNF included in a service chain in the service chain template.

Certainly, after sending the service chain template information to the NFVO, the OSS/BSS may further receive information indicating that the service chain template information has been received, which is not limited in this embodiment.

In addition, after the OSS/BSS sends the service chain template information to the NFVO, if the route and resource configuration succeeds, the OSS/BSS may further receive information indicating that the route and resource configuration succeeds, which is not limited in this embodiment.

Based on the method for service implementation in an NFV system provided in this embodiment, an OSS/BSS can obtain information about a service chain template through which a service route passes, where the service chain template information is used to indicate a correspondence between a service chain identifier and information about a service chain; and then send the service chain template information to an NFVO, so that the NFVO requests, according to the service chain template information, to perform route and resource configuration for a VNF included in a service chain in the service chain template, implementing a function of obtaining upper-layer information about a service chain and guiding route and resource configuration of an NFVI by using the upper-layer information about a service chain, and implementing establishment of an NFV network service chain.

Embodiment 4

Figure 10:
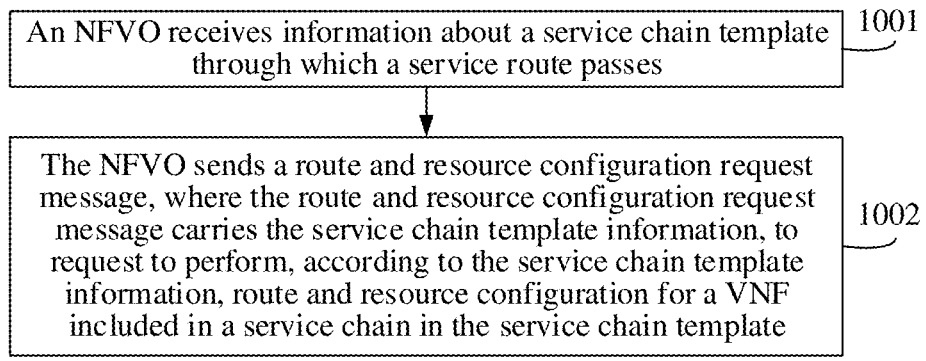
FIG. 10 shows another method for service implementation in an NFV system according to an embodiment.

This embodiment provides a method for service implementation in an NFV system. As shown in FIG. 10, the method includes:

1001: An NFVO receives information about a service chain template through which a service route passes.

The service chain template information is used to indicate a correspondence between a service chain identifier and information about a service chain.

In this embodiment, the NFVO first receives information about a service chain template through which a service route passes, where the service chain template information is generated and maintained by an OSS/BSS, and is use to indicate a correspondence between a service chain identifier and information about a service chain.

In this embodiment, the service chain template information may include information such as a service chain identifier and a sequence of VNFs corresponding to a service chain. For a specific example, refer to Table 2 in Embodiment 3. Details are not repeated herein.

1002: The NFVO sends a route and resource configuration request message, where the route and resource configuration request message carries the service chain template information, to request to perform, according to the service chain template information, route and resource configuration for a VNF included in a service chain in the service chain template.

In this embodiment, after receiving the information about the service chain template through which the service route passes, the NFVO instructs a second communications unit to perform route and resource configuration for a VNF included in a service chain in the service chain template. Therefore, the NFVO needs to send a route and resource configuration request message, where the route and resource configuration request message carries the service chain template information, to request to perform, according to the service chain template information, the route and resource configuration for the VNF included in the service chain in the service chain template.

The second communications unit may be a VIM, or may be an NFVI controller, which is not limited in this embodiment. For a related description of the NFVI controller, refer to the part of step 501 in Embodiment 2. Details are not repeated herein in this embodiment.

Certainly, after receiving the information about the service chain template through which the service route passes, the NFVO may further send information indicating that the service chain template information has been received, which is not limited in this embodiment.

In addition, in this embodiment, after the NFVO sends the route and resource configuration request message, if the route and resource configuration succeeds, the NFVO may further receive information indicating that the route and resource configuration succeeds, which is not limited in this embodiment.

Based on the method for service implementation in an NFV system provided in this embodiment, an NFVO can receive information about a service chain template through which a service route passes, where the service chain template information is used to indicate a correspondence between a service chain identifier and information about a service chain; and then send a route and resource configuration request message, where the route and resource configuration request message carries the service chain template information, to request to perform, according to the service chain template information, route and resource configuration for a VNF included in a service chain in the service chain template, implementing a function of obtaining upper-layer information about a service chain and guiding route and resource configuration of an NFVI by using the upper-layer information about a service chain, and implementing establishment of an NFV network service chain.

Embodiment 5

Figure 11:
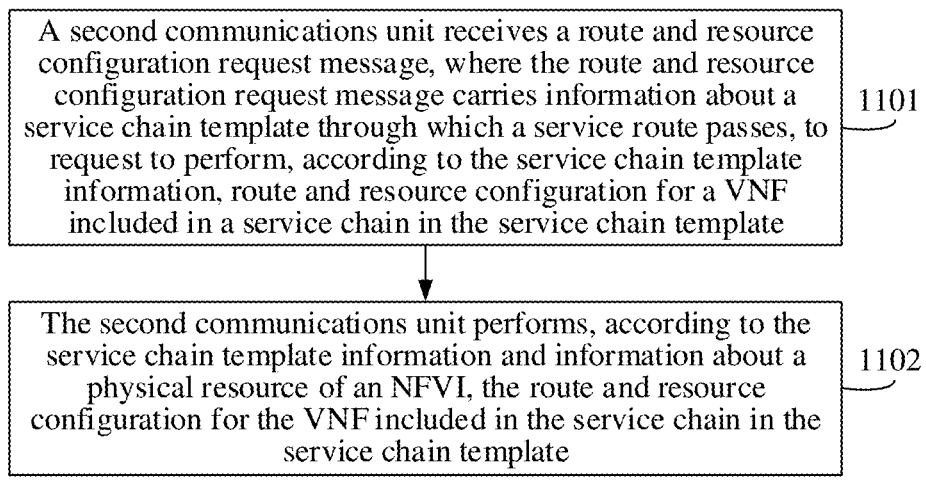
FIG. 11 shows still another method for service implementation in an NFV system according to an embodiment.

This embodiment provides a method for service implementation in an NFV system. As shown in FIG. 11, the method includes.

1101: A second communications unit receives a route and resource configuration request message, where the route and resource configuration request message carries information about a service chain template through which a service route passes, to request to perform, according to the service chain template information, route and resource configuration for a VNF included in a service chain in the service chain template.

The service chain template information is used to indicate a correspondence between a service chain identifier and information about a service chain.

The second communications unit that executes this embodiment may be a VIM, or may be an NFVI controller, which is not limited in this embodiment.

For a related description of the NFVI controller, refer to a related description of step 501 in Embodiment 2. Details are not repeated herein.

In this embodiment, the service chain template information may include information such as a service chain identifier and a sequence of VNFs corresponding to a service chain. For a specific example, refer to Table 2 in Embodiment 3. Details are not repeated herein.

In this embodiment, the route and resource configuration request message received by the second communications unit may be sent by a VNFM, or may be sent by an OSS/BSS, which is not limited in this embodiment.

1102: The second communications unit performs, according to the service chain template information and information about a physical resource of an NFVI, the route and resource configuration for the VNF included in the service chain in the service chain template.

In this embodiment, after receiving the route and resource configuration request message, the second communications unit performs, according to the service chain template information and the information about the physical resource of the NFVI, the route and resource configuration for the VNF included in the service chain in the service chain template.

For a specific manner for the second communications unit to perform the route and resource configuration for the VNF included in the service chain in the service chain template, refer to a related description of step 502 in Embodiment 2. Details are not repeated herein in this embodiment.

Certainly, after receiving the route and resource configuration request message, if the route and resource configuration succeeds, the second communications unit may further send information indicating that the route and resource configuration succeeds, which is not limited in this embodiment.

Based on the method for service implementation in an NFV system provided in this embodiment, a second communications unit receives a route and resource configuration request message, where the route and resource configuration request message carries information about a service chain template through which a service route passes, to request to perform, according to the service chain template information, route and resource configuration for a VNF included in the service chain in the service chain template; and then performs, according to the service chain template information and information about a physical resource of an NFVI, the route and resource configuration for the VNF included in the service chain in the service chain template, implementing a function of obtaining upper-layer information about a service chain and guiding route and resource configuration of the NFVI by using the upper-layer information about a service chain, and implementing establishment of an NFV network service chain.

Embodiment 6

Figure 12:
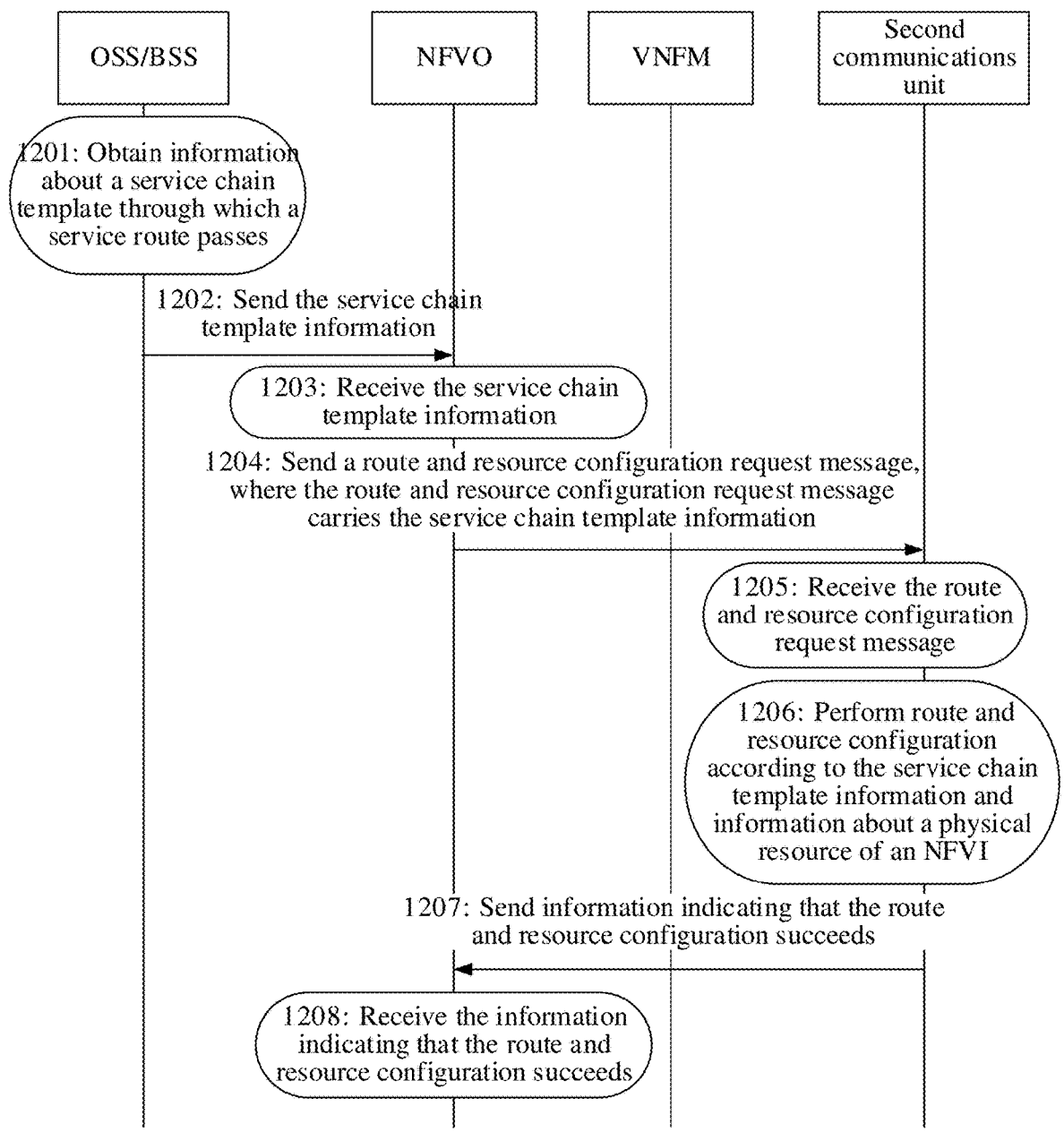
FIG. 12 shows still another method for service implementation in an NFV system according to an embodiment.

This embodiment provides a method for service implementation in an NFV system. The method is described by using interaction between an OSS/BSS, an NFVO, a VNFM, and a second communications unit as an example. As shown in FIG. 12, the method includes:

1201: An OSS/BSS obtains information about a service chain template through which a service route passes.

The service chain template information is used to indicate a correspondence between a service chain identifier and information about a service chain.

1202: The OSS/BSS sends the service chain template information to an NFVO.

In this embodiment, for related descriptions of steps 1201 and 1202, refer to related descriptions of step 901 and step 902 in Embodiment 3. Details are not repeated herein.

1203: The NFVO receives the service chain template information.

1204: The NFVO sends a route and resource configuration request message to a second communications unit, where the route and resource configuration request message carries the service chain template information, to request to perform, according to the service chain template information, route and resource configuration for a VNF included in a service chain in the service chain template.

In this embodiment, for related descriptions of step 1203 and step 1204, refer to related descriptions of steps 1001 and 1002 in Embodiment 4. Details are not repeated herein.

The second communications unit may be a VIM, or may be an NFVI controller, which is not limited in this embodiment. For a related description of the NFVI controller, refer to the part of step 501 in Embodiment 2. Details are not repeated herein in this embodiment.

In this embodiment, the NFVO may directly send the route and resource configuration request message to the second communications unit, or may first send the route and resource configuration request message to a VNFM, and then send the route and resource configuration request message to the second communications unit by using the VNFM, which is not limited in this embodiment.

1205: The second communications unit receives the route and resource configuration request message.

1206: The second communications unit performs, according to the service chain template information carried in the route and resource configuration request message and information about a physical resource of an NFVI, the route and resource configuration for the VNF included in the service chain in the service chain template.

In this embodiment, for related descriptions of step 1205 and step 1206, refer to related descriptions of steps 1101 and 1102 in Embodiment 5. Details are not repeated herein.

1207: The second communications unit sends, to the NFVO, information indicating that the route and resource configuration succeeds.

In this embodiment, the second communications unit may directly send, to the NFVO, the information indicating that the route and resource configuration succeeds, or may first send, to the VNFM, the information indicating that the route and resource configuration succeeds, and then send, to the NFVO by using the VNFM, the information indicating that the route and resource configuration succeeds, which is not limited in this embodiment.

1208: The NFVO receives the information indicating that the route and resource configuration succeeds.

It should be noted that, after step 1203, the NFVO may further send, to the OSS/BSS, information indicating that the service chain template information has been received, which is not limited in this embodiment.

It should be noted that, after step 1208, the NFVO may further send, to the second communications unit, the information indicating that the route and resource configuration succeeds, which is not limited in this embodiment.

It should be noted that, after obtaining the information about the service chain template through which the service route passes, the OSS/BSS interacts with a PCRF to establish a correspondence between a service chain and a user package, so that the PCRF configures user identification information and a corresponding service chain identifier. Exemplarily, a correspondence between a service chain identifier and a user package may be shown in Table 3:

TABLE 3

| User package | | | |
|---|---|---|---|
| Application | User level | Wireless access network | service chain identifier |
| Video | Gold (G) | 3G | 1 |
| Facebook | Silver (S) | 2G | 2 |
| Browser | Bronze (B) | 3G | 3 |
| ... | ... | ... | ... |

It should be noted that, after successfully performing the route and resource configuration according to the service chain template information as instructed by the NFVO, the second communications unit may forward a service stream. A service stream forwarding process does not belong to the protection scope of the embodiments, and therefore is not described in detail in this embodiment.

Based on the method for service implementation in an NFV system provided in this embodiment, an OSS/BSS obtains information about a service chain template through which a service route passes, where the service chain template information is used to indicate a correspondence between a service chain identifier and information about a service chain; and sends the service chain template information to an NFVO, so that the NFVO requests, according to the service chain template information, a second communications unit to perform route and resource configuration for a VNF included in a service chain in the service chain template, implementing a function of obtaining upper-layer information about a service chain and guiding route and resource configuration of an NFVI by using the upper-layer information about a service chain, and implementing establishment of an NFV network service chain.

Embodiment 7

Figure 13:
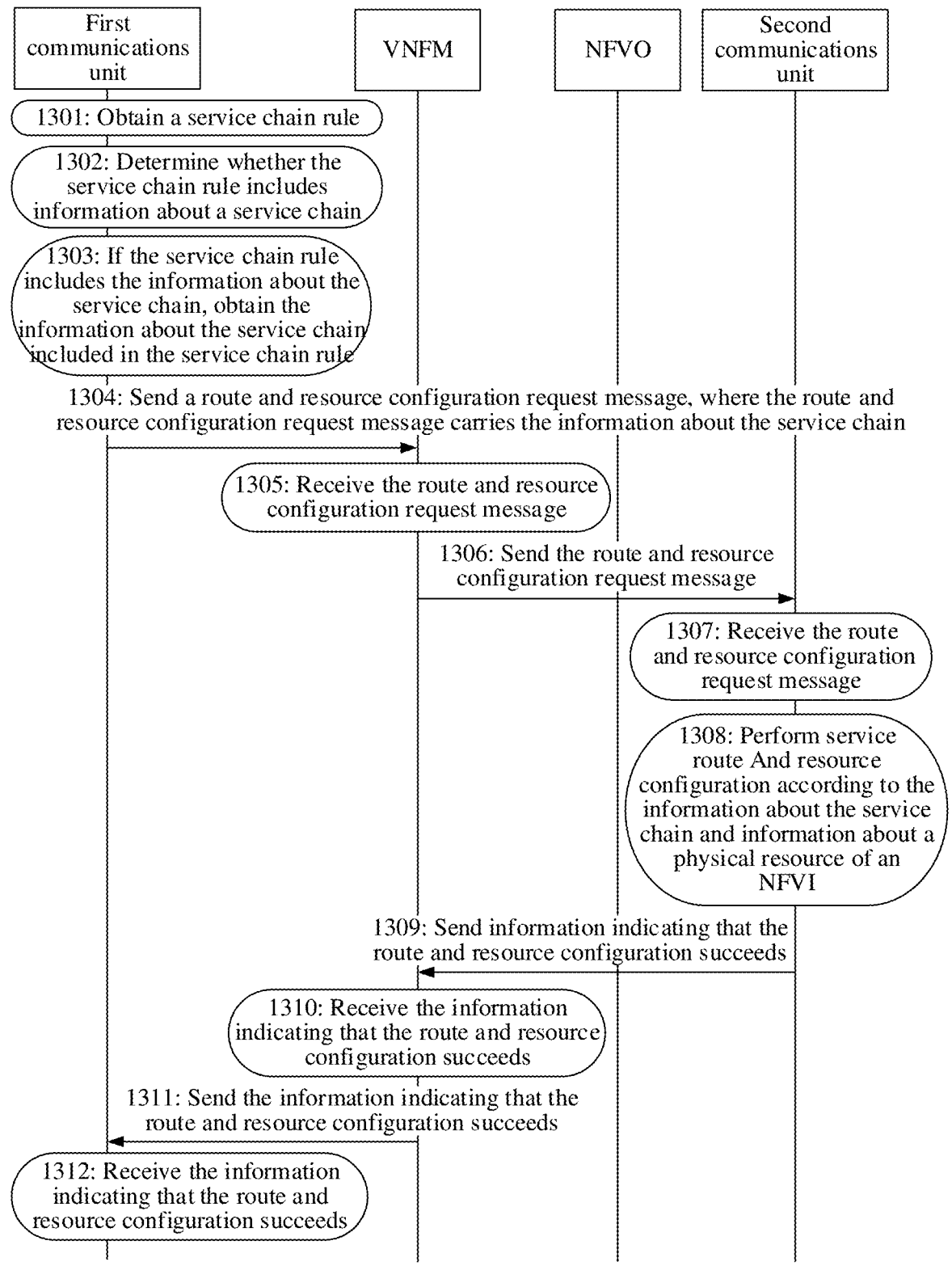
FIG. 13 shows still another method for service implementation in an NFV system according to an embodiment.

This embodiment provides a method for service implementation in an NFV system. The method is described by using interaction between a first communications unit, a VNFM, an NFVO, and a second communications unit as an example, where it is assumed that the first communications unit is a VNF. As shown in FIG. 13, the method includes:

1301: A first communications unit obtains a service chain rule, where the service chain rule is used to indicate service processing that needs to be performed.

In this embodiment, the first communications unit is a VNF, and may be a service chain controller, or may be a network node such as a PGW, a PCRF, a TDF, or a traffic classifier, which is not limited in this embodiment. For a related description of the service chain controller, refer to a description of step 301 in Embodiment 1. Details are not repeated herein in this embodiment.

For a related description of the service chain rule, refer to a description of step 301 in Embodiment 1. Details are not repeated herein in this embodiment.

1302: The first communications unit determines whether the service chain rule includes information about a service chain.

The information about the service chain is used to indicate information about a VNF through which a service route passes, and the VNF is configured for the service processing.

It can be known according to a related description of the service chain rule in step 301 in Embodiment 1 that, the service chain rule may directly include information about a service chain, or may not include information about a service chain. Therefore, in this embodiment, after obtaining the service chain rule, the first communications unit first determines whether the service chain rule includes the information about the service chain. If the service chain rule includes the information about the service chain, step 1303 is performed.

For a related description of the information about the service chain, refer to a related description of step 302 in Embodiment 1. Details are not repeated herein in this embodiment.

1303: If the service chain rule includes the information about the service chain, the first communications unit obtains the information about the service chain included in the service chain rule.

1304: The first communications unit sends a route and resource configuration request message to a VNFM, where the route and resource configuration request message carries the information about the service chain, to request to perform, according to the information about the service chain, route and resource configuration for a VNF included in a service chain.

In this embodiment, after obtaining the information about the service chain, the first communications unit sends a route and resource configuration request message to a VNFM.

1305: The VNFM receives the route and resource configuration request message.

1306: The VNFM sends the route and resource configuration request message to a second communications unit.

In this embodiment, the VNFM may directly send the route and resource configuration request message to the second communications unit, or may first send the route and resource configuration request message to an NFVO, and the NFVO sends the route and resource configuration request message to the second communications unit, which is not limited in this embodiment.

The second communications unit may be a VIM, or may be an NFVI controller, which is not limited in this embodiment. For a related description of the NFVI controller, refer to the part of step 501 in Embodiment 2. Details are not repeated herein in this embodiment.

1307: The second communications unit receives the route and resource configuration request message.

1308: The second communications unit performs, according to the information about the service chain carried in the route and resource configuration request message and information about a physical resource of an NFVI, service route and resource configuration for the VNF included in the service chain.

In this embodiment, for a method for the second communications unit to perform, according to the information about the service chain carried in the route and resource configuration request message and the information about the physical resource of the NFVI, the service route and resource configuration for the VNF included in the service chain, refer to a description of step 502 in Embodiment 2. Details are not repeated therein in this embodiment.

1309: The second communications unit sends, to the VNFM, information indicating that the route and resource configuration succeeds.

In this embodiment, the second communications unit may directly send, to the VNFM, the information indicating that the route and resource configuration succeeds, or may first send, to the NFVO, the information indicating that the route and resource configuration succeeds, and the NFVO sends, to the VNFM, the information indicating that the route and resource configuration succeeds, which is not limited in this embodiment.

1310: The VNFM receives the information indicating that the route and resource configuration succeeds.

1311: The VNFM sends, to the first communications unit, the information indicating that the route and resource configuration succeeds.

1312: The first communications unit receives the information indicating that the route and resource configuration succeeds.

Figure 14A:
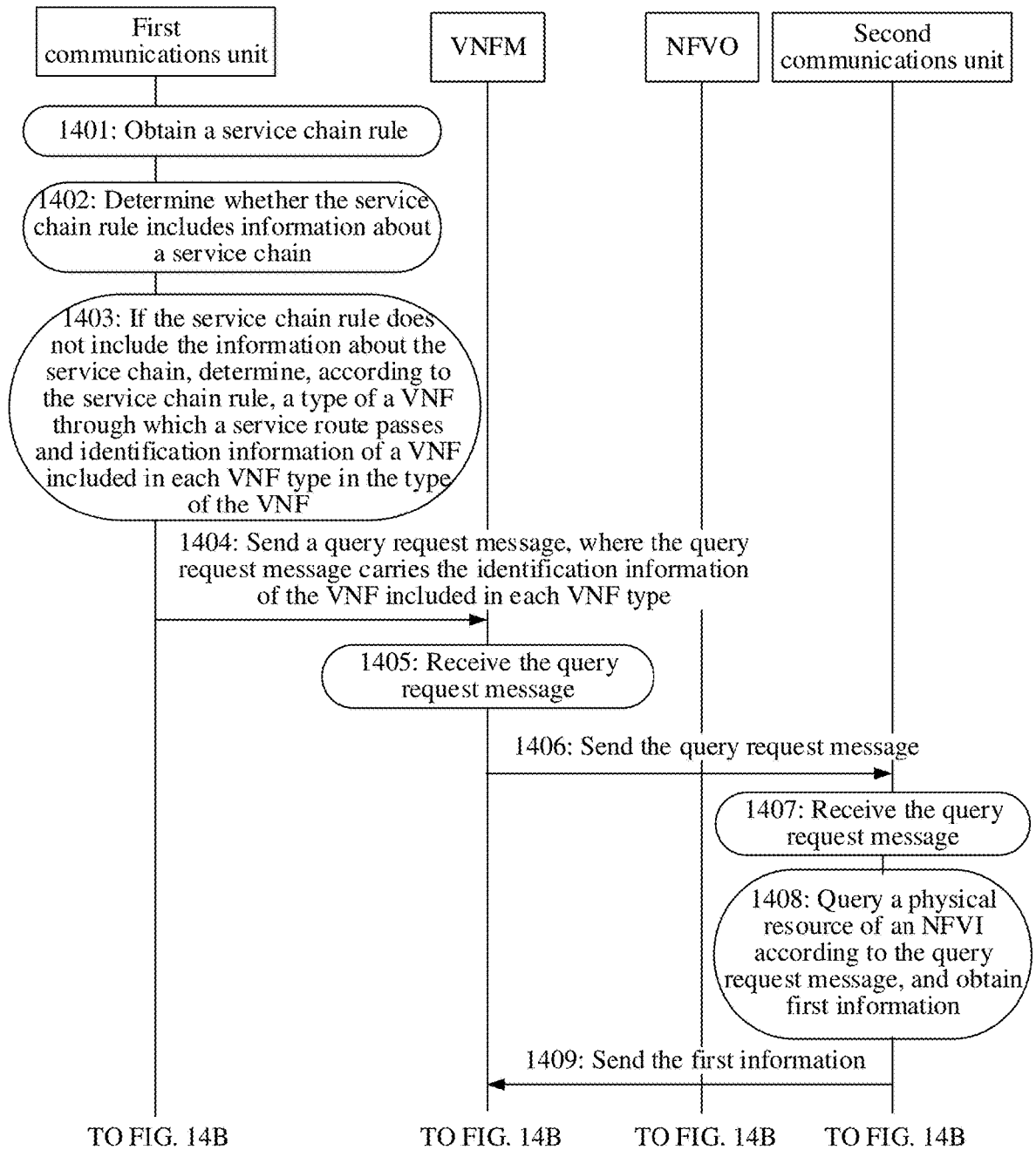
FIG. 14A and FIG. 14B show still another method for service implementation in an NFV system according to an embodiment.
Figure 14B:
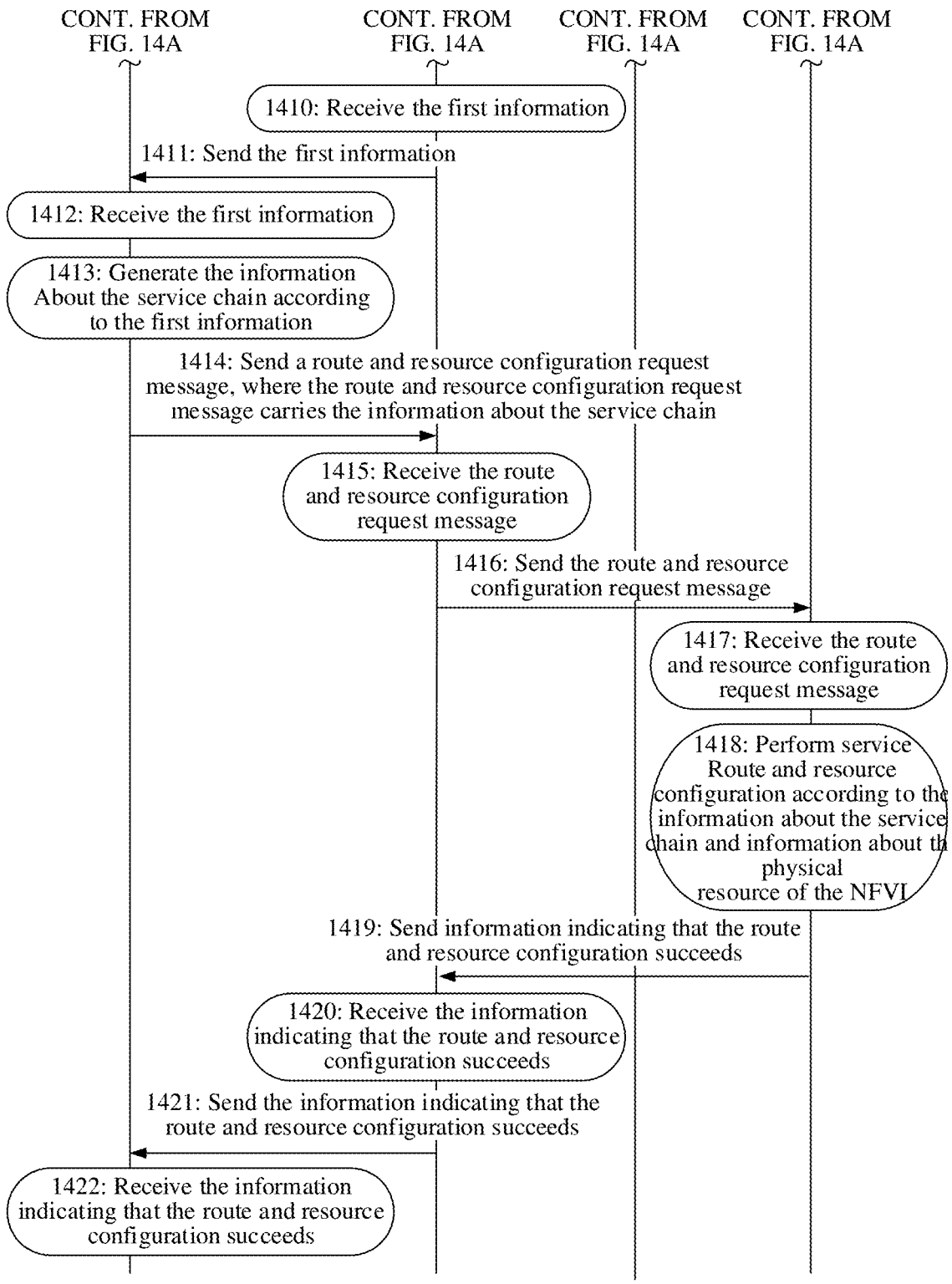

Optionally, this embodiment provides a method for service implementation in an NFV system. The method is described by using interaction between a first communications unit, a VNFM, an NFVO, and a second communications unit as an example, where it is assumed that the first communications unit is a VNF. As shown in FIG. 14A and FIG. 14B, the method includes.

1401: A first communications unit obtains a service chain rule, where the service chain rule is used to indicate service processing that needs to be performed.

In this embodiment, the first communications unit is a VNF, and may be a service chain controller, or may be a network node such as a PGW, a PCRF, a TDF, or a traffic classifier, which is not limited in this embodiment. For a related description of the service chain controller, refer to a description of step 301 in Embodiment 1. Details are not repeated herein in this embodiment.

For a related description of the service chain rule, refer to a description of step 301 in Embodiment 1. Details are not repeated herein in this embodiment.

1402: The first communications unit determines whether the service chain rule includes information about a service chain.

The information about the service chain is used to indicate information about a VNF through which a service route passes, and the VNF is configured for the service processing.

It can be known according to a related description of the service chain rule in step 301 in Embodiment 1 that, the service chain rule may directly include information about a service chain, or may not include information about a service chain. Therefore, in this embodiment, after obtaining the service chain rule, the first communications unit first determines whether the service chain rule includes the information about the service chain. If the service chain rule does not include the information about the service chain, step 1403 is performed.

For a related description of the information about the service chain, refer to a related description of step 302 in Embodiment 1. Details are not repeated herein in this embodiment.

1403: If the service chain rule does not include the information about the service chain, the first communications unit determines, according to the service chain rule, a type of a VNF through which a service route passes and identification information of a VNF included in each VNF type in the type of the VNF.

Exemplarily, assuming that the service chain rule includes a service route policy, for example, video optimization, the first communications unit needs to determine, according to an instruction of the service route policy, types of VNFs through which the video optimization needs to pass: TCP proxy->Video Cache->NAT and identification information of a VNF included in each VNF type. For example, a VNF for implementing a TCP proxy function includes VNF1 and VNF7; a VNF for implementing a Video Cache function includes VNF2 and VNF8; and a VNF for implementing an NAT function includes VNF3.

Certainly, the service chain rule may directly include the type of the VNF through which the service route passes, which is not limited in this embodiment.

1404: The first communications unit sends a query request message to a VNFM, where the query request message carries the identification information of the VNF included in each VNF type, to request to query, according to the identification information of the VNF, first information of the VNF included in each VNF type, where the first information is used to indicate a network topology, a node capability, and a status of the NFVI.

In this embodiment, after determining the type of the VNF through which service route passes and the identification information of the VNF included in each VNF type in the type of the VNF, the first communications unit sends a query request message to a VNFM, to query first information of the VNF included in each VNF type.

Exemplarily, based on the example in step 1403, the first communications unit sends a query request message, to query first information of VNF1, VNF7, VNF2, VNF8, and VNF3, where the first information is used to indicate the network topology, a node capability, and a status of the NFVI.

1405: The VNFM receives the query request message.

1406: The VNFM sends the query request message to a second communications unit.

In this embodiment, the VNFM may directly send the query request message to the second communications unit, or may first send the query request message to an NFVO, and the NFVO sends the query request message to the second communications unit, which is not limited in this embodiment.

The second communications unit may be a VIM, or may be an NFVI controller, which is not limited in this embodiment. For a related description of the NFVI controller, refer to the part of step 501 in Embodiment 2. Details are not repeated herein in this embodiment.

1407: The second communications unit receives the query request message.

1408: The second communications unit queries the physical resource of the NFVI according to the query request message, and obtains the first information.

Exemplarily, based on the example in step 1403, the second communications unit may separately query the first information of VNF1, VNF7, VNF2, VNF8, and VNF3 and then obtain the first information, for example, the first information maybe: resource load of VNF1 exceeds a preset threshold, resource load of VNF7, VNF2, and VNF3 is relatively small, and resource load of VNF8 is relatively large.

1409: The second communications unit sends the first information to the VNFM.

In this embodiment, the second communications unit may directly send the first information to the VNFM, or may first send the first information to the NFVO, and the NFVO sends the first information to the VNFM, which is not limited in this embodiment.

1410: The VNFM receives the first information.

1411: The VNFM sends the first information to the first communications unit.

1412: The first communications unit receives the first information.

1413: The first communications unit generates the information about the service chain according to the first information.

After receiving the first information, the first communications unit generates the information about the service chain according to the first information.

Exemplarily, based on the example in step 1408, if the first information is: resource load of VNF1 exceeds a preset threshold, resource load of VNF7, VNF2, and VNF3 is relatively small, and resource load of VNF8 is relatively large, a service chain may be generated as follows according to the first information:

VNF7->VNF2->VNF3.

It should be noted that, the foregoing example merely exemplarily provides a method of obtaining information about a service chain according to a service chain rule, and certainly, according to different service chain rules, information about a service chain obtained after query of the second communications unit may be different, which is not limited in this embodiment.

1414: The first communications unit sends a route and resource configuration request message to the VNFM, where the route and resource configuration request message carries the information about the service chain, to request to perform, according to the information about the service chain, route and resource configuration for the VNF included in a service chain.

1415: The VNFM receives the route and resource configuration request message.

1416: The VNFM sends the route and resource configuration request message to the second communications unit.

1417: The second communications unit receives the route and resource configuration request message.

1418: The second communications unit performs service route and resource configuration according to the information about the service chain carried in the route and resource configuration request message and information about the physical resource of the NFVI.

1419: The second communications unit sends, to the VNFM, information indicating that the route and resource configuration succeeds.

1420: The VNFM receives the information indicating that the route and resource configuration succeeds.

1421: The VNFM sends, to the first communications unit, the information indicating that the route and resource configuration succeeds.

1422: The first communications unit receives the information indicating that the route and resource configuration succeeds.

In this embodiment, for related descriptions of steps 1414 to 1422, refer to descriptions of steps 1304 to 1312 in the embodiment shown in FIG. 13. Details are not repeated herein in this embodiment.

Figure 15:
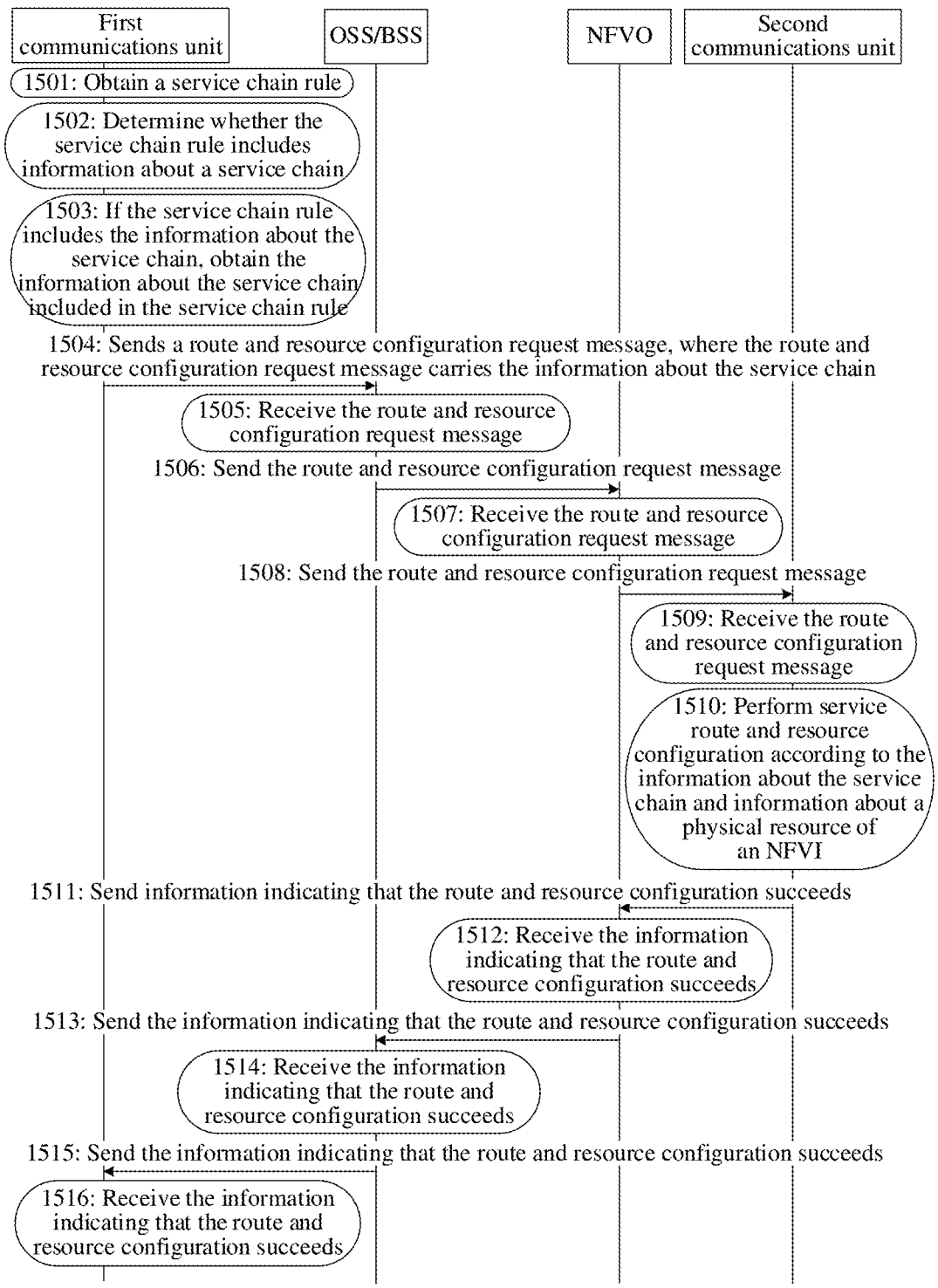
FIG. 15 shows still another method for service implementation in an NFV system according to an embodiment.

This embodiment further provides a method for service implementation in an NFV system. The method is described by using interaction between a first communications unit, an OSS/BSS, a VNFM, an NFVO, and a second communications unit as an example, where the first communications unit may be a VNF, or may be a PNF, which is not limited in this embodiment. As shown in FIG. 15, the method includes:

1501: A first communications unit obtains a service chain rule, where the service chain rule is used to indicate service processing that needs to be performed.

In this embodiment, the first communications unit may be a service chain controller, or may be a network node such as a PGW, a PCRF, a TDF, or a traffic classifier, which is not limited in this embodiment. For a related description of the service chain controller, refer to a description of step 301 in Embodiment 1. Details are not repeated herein in this embodiment.

It should be noted that, in this embodiment, the network node such as the PGW, the PCRF, the TDF, or the traffic classifier may be a VNF unit, or may be a PNF unit, which is not limited in this embodiment.

For a related description of the service chain rule, refer to a description of step 301 in Embodiment 1. Details are not repeated herein in this embodiment.

1502: The first communications unit determines whether the service chain rule includes information about a service chain.

The information about the service chain is used to indicate information about a VNF through which a service route passes, and the VNF is configured for the service processing.

It can be known according to a related description of the service chain rule in step 301 in Embodiment 1 that, the service chain rule may directly include information about a service chain, or may not include information about a service chain. Therefore, in this embodiment, after obtaining the service chain rule, the first communications unit first determines whether the service chain rule includes the information about the service chain. If the service chain rule includes the information about the service chain, step 1503 is performed.

For a related description of the information about the service chain, refer to a related description of step 302 in Embodiment 1. Details are not repeated herein in this embodiment.

1503: If the service chain rule includes the information about the service chain, the first communications unit obtains the information about the service chain included in the service chain rule.

1504: The first communications unit sends a route and resource configuration request message to an OSS/BSS, where the route and resource configuration request message carries the information about the service chain, to request to perform, according to the information about the service chain, route and resource configuration for a VNF included in a service chain.

In this embodiment, after obtaining the information about the service chain, the first communications unit sends a route and resource configuration request message to an OSS/BSS.

1505: The OSS/BSS receives the route and resource configuration request message.

1506: The OSS/BSS sends the route and resource configuration request message to an NFVO.

1507: The NFVO receives the route and resource configuration request message.

1508: The NFVO sends the route and resource configuration request message to a second communications unit.

In this embodiment, the NFVO may directly send the route and resource configuration request message to the second communications unit, or may first send the route and resource configuration request message to a VNFM, and the VNFM sends the route and resource configuration request message to the second communications unit, which is not limited in this embodiment.

The second communications unit may be a VIM, or may be an NFVI controller, which is not limited in this embodiment. For a related description of the NFVI controller, refer to the part of step 501 in Embodiment 2. Details are not repeated herein in this embodiment.

1509: The second communications unit receives the route and resource configuration request message.

1510: The second communications unit performs, according to the information about the service chain carried in the route and resource configuration request message and information about a physical resource of an NFVI, service route and resource configuration for the VNF included in the service chain.

In this embodiment, for a method for the second communications unit to perform, according to the information about the service chain carried in the route and resource configuration request message and the information about the physical resource of the NFVI, the service route and resource configuration for the VNF included in the service chain, refer to a description of step 502 in Embodiment 2. Details are not repeated therein in this embodiment.

1511: The second communications unit sends, to the NFVO, information indicating that the route and resource configuration succeeds.

In this embodiment, the second communications unit may directly send, to the NFVO, the information indicating that the route and resource configuration succeeds, or may first send, to the VNFM, the information indicating that the route and resource configuration succeeds, and the VNFM sends, to the NFVO, the information indicating that the route and resource configuration succeeds, which is not limited in this embodiment.

1512: The NFVO receives the information indicating that the route and resource configuration succeeds.

1513: The NFVO sends, to the OSS/BSS, the information indicating that the route and resource configuration succeeds.

1514: The OSS/BSS receives the information indicating that the route and resource configuration succeeds.

1515: The OSS/BSS sends, to the first communications unit, the information indicating that the route and resource configuration succeeds.

1516: The first communications unit receives the information indicating that the route and resource configuration succeeds.

Figure 16A:
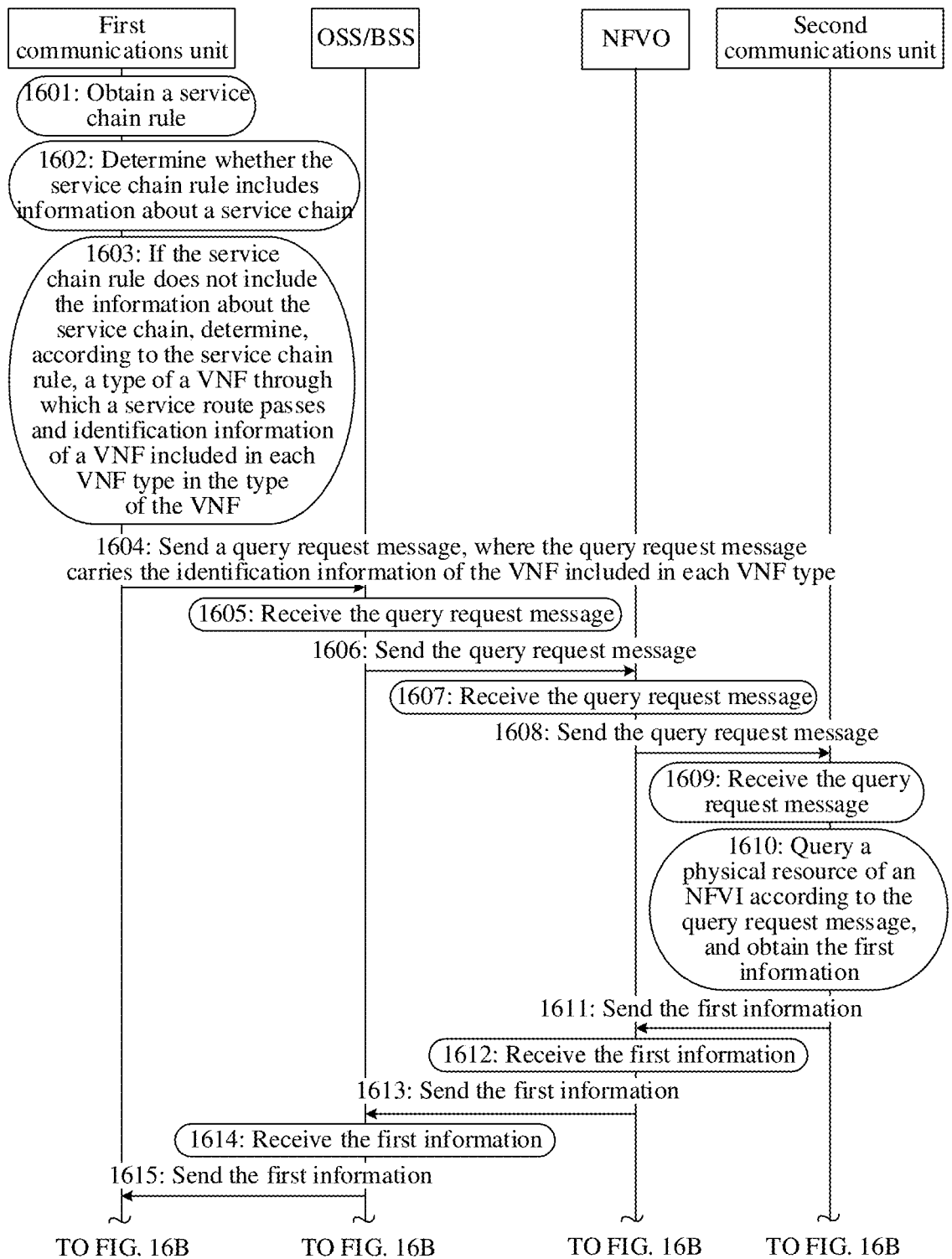
FIG. 16A and FIG. 16B show still another method for service implementation in an NFV system according to an embodiment.
Figure 16B:
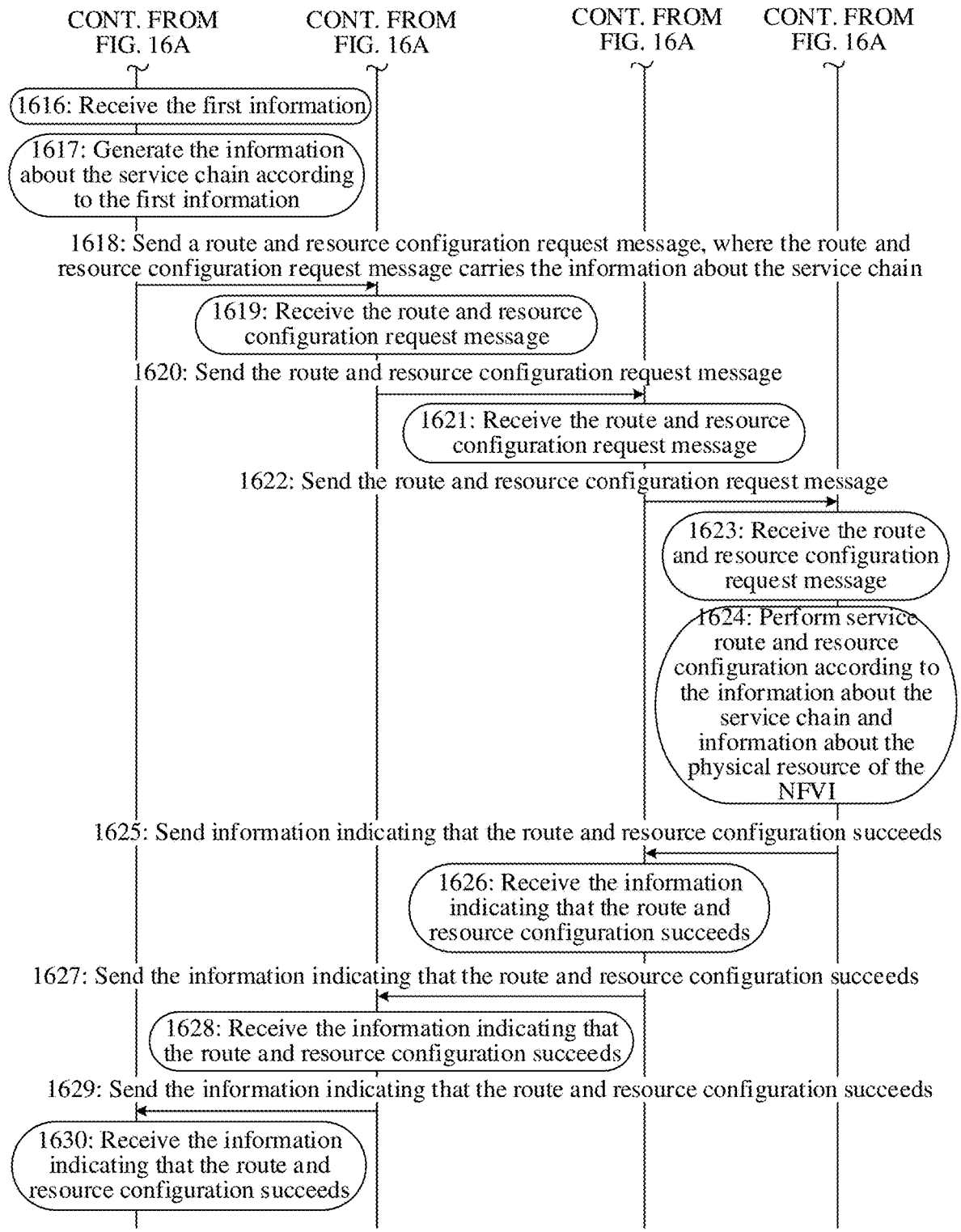

Optionally, this embodiment further provides a method for service implementation in an NFV system. The method is described by using interaction between a first communications unit, an OSS/BSS, a VNFM, an NFVO, and a second communications unit as an example, where the first communications unit may be a VNF, or may be a PNF, which is not limited in this embodiment. As shown in FIG. 16A and FIG. 16B, the method includes.

1601: A first communications unit obtains a service chain rule, where the service chain rule is used to indicate service processing that needs to be performed.

In this embodiment, the first communications unit may be a service chain controller, or may be a network node such as a PGW, a PCRF, a TDF, or a traffic classifier, which is not limited in this embodiment. For a related description of the service chain controller, refer to a description of step 301 in Embodiment 1. Details are not repeated herein in this embodiment.

It should be noted that, in this embodiment, the network node such as the PGW, the PCRF, the TDF, or the traffic classifier may be a VNF unit, or may be a PNF unit, which is not limited in this embodiment.

For a related description of the service chain rule, refer to a description of step 301 in Embodiment 1. Details are not repeated herein in this embodiment.

1602: The first communications unit determines whether the service chain rule includes information about a service chain.

The information about the service chain is used to indicate information about a VNF through which a service route passes, and the VNF is configured for the service processing.

It can be known according to a related description of the service chain rule in step 301 in Embodiment 1 that, the service chain rule may directly include information about a service chain, or may not include information about a service chain. Therefore, in this, after obtaining the service chain rule, the first communications unit first determines whether the service chain rule includes the information about the service chain. If the service chain rule does not include the information about the service chain, step 1603 is performed.

For a related description of the information about the service chain, refer to a related description of step 302 in Embodiment 1. Details are not repeated herein in this embodiment.

1603: If the service chain rule does not include the information about the service chain, the first communications unit determines, according to the service chain rule, a type of a VNF through which a service route passes and identification information of a VNF included in each VNF type in the type of the VNF.

1604: The first communications unit sends a query request message to an OSS/BSS, where the query request message carries the identification information of the VNF included in each VNF type, to request to query, according to the identification information of the VNF, first information of the VNF included in each VNF type, where the first information is used to indicate a network topology, a node capability, and a status of an NFVI.

1605: The OSS/BSS receives the query request message.

1606: The OSS/BSS sends the query request message to an NFVO.

1607: The NFVO receives the query request message.

1608: The NFVO sends the query request message to a second communications unit.

In this embodiment, the NFVO may directly send the query request message to the second communications unit, or may first send the query request message to a VNFM, and the VNFM sends the query request message to the second communications unit, which is not limited in this embodiment.

The second communications unit may be a VIM, or may be an NFVI controller, which is not limited in this embodiment. For a related description of the NFVI controller, refer to the part of step 501 in Embodiment 2. Details are not repeated herein in this embodiment.

1609: The second communications unit receives the query request message.

1610: The second communications unit queries the physical resource of the NFVI according to the query request message, and obtains the first information.

1611: The second communications unit sends the first information to the NFVO.

In this embodiment, the second communications unit may directly send the first information to the NFVO, or may first send the first information to the VNFM, and the VNFM sends the first information to the NFVO, which is not limited in this embodiment.

1612: The NFVO receives the first information.

1613: The NFVO sends the first information to the OSS/BSS.

1614: The OSS/BSS receives the first information.

1615: The OSS/BSS sends the first information to the first communications unit.

1616: The first communications unit receives the first information.

1617: The first communications unit generates the information about the service chain according to the first information.

In this embodiment, for an example in which the first communications unit obtains the information about the service chain after querying the second communications unit according to the service chain rule, refer to the example in the embodiment shown in FIG. 14A and FIG. 14B in which the first communications unit obtains the information about the service chain after querying the second communications unit according to the service chain rule. Details are not repeated herein in this embodiment.

1618: The first communications unit sends a route and resource configuration request message to the OSS/BSS, where the route and resource configuration request message carries the information about the service chain, to request to perform, according to the information about the service chain, route and resource configuration for the VNF included in a service chain.

1619: The OSS/BSS receives the route and resource configuration request message.

1620: The OSS/BSS sends the route and resource configuration request message to the NFVO.

1621: The NFVO receives the route and resource configuration request message.

1622: The NFVO sends the route and resource configuration request message to the second communications unit.

1623: The second communications unit receives the route and resource configuration request message.

1624: The second communications unit performs service route and resource configuration according to the information about the service chain carried in the route and resource configuration request message and information about the physical resource of the NFVI.

1625: The second communications unit sends, to the NFVO, information indicating that the route and resource configuration succeeds.

1626: The NFVO receives the information indicating that the route and resource configuration succeeds.

1627: The NFVO sends, to the OSS/BSS, the information indicating that the route and resource configuration succeeds.

1628: The OSS/BSS receives the information indicating that the route and resource configuration succeeds.

1629: The OSS/BSS sends, to the first communications unit, the information indicating that the route and resource configuration succeeds.

1630: The first communications unit receives the information indicating that the route and resource configuration succeeds.

In this embodiment, for related descriptions of steps 1418 to 1430, refer to descriptions of steps 1304 to 1316 in the embodiment shown in FIG. 15. Details are not repeated herein in this embodiment.

It should be noted that, in the embodiment shown in FIG. 13 or FIG. 15, when the service chain rule includes the information about the service chain, the first communications unit may also query, by using the second communications unit, the first information of the VNF included in the service chain, to determine whether a state of the VNF included in the service chain is abnormal. When the second communications unit obtains through query that a state of a VNF included in the service chain is abnormal (for example, resource load exceeds a preset threshold), the second communications unit feeds back abnormality information to the first communications unit in time, so that the first communications unit feeds back the abnormality information to an entity that sends the service chain rule, and the entity that sends the service chain rule then performs corresponding processing according to a corresponding policy, for example, re-sends information about a service chain. Whether the first information of the VNF included in the service chain needs to be queried by using the second communications unit when the service chain rule includes the information about the service chain is not limited in this embodiment n.

It should be noted that, as described above, in the embodiments shown in FIG. 13 to FIG. 16A and FIG. 16B, the second communications unit may be a VIM, or may be an NFVI controller. If the second communications unit is an NFVI controller, a unit that directly communicates with the NFVI controller is generally a VIM, that is, a previous-hop communications unit of the NFVI controller is generally a VIM. Exemplarily, for example, in step 1306 in the embodiment shown in FIG. 13, when the VNFM sends the route and resource configuration request message to the second communications unit, a specific implementation path may be: sending, by the VNFM, the route and resource configuration request message to a VIM, and sending, by the VIM, the route and resource configuration request message to the NFVI controller, which is not limited in this embodiment.

Based on the method for service implementation in an NFV system provided in this embodiment, after obtaining a service chain rule, a first communications unit can obtain, according to the service chain rule, information about a service chain through which a service route passes, and then send a route and configuration request message that carries the information about the service chain, to request to perform, according to the information about the service chain, route and resource configuration for a VNF included in the service chain, implementing a function of obtaining upper-layer information about a service chain and guiding route and resource configuration of an NFVI by using the upper-layer information about a service chain, and implementing establishment of an NFV network service chain.

Embodiment 8

Figure 17:
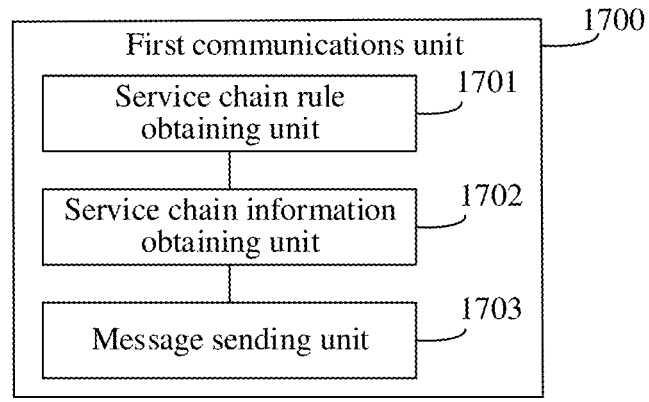
FIG. 17 is a schematic structural diagram of a first communications unit according to an embodiment.

This embodiment provides a first communications unit 1700. As shown in FIG. 17, the first communications unit 1700 includes: a service chain rule obtaining unit 1701, a service chain information obtaining unit 1702, and a message sending unit 1703, where the service chain rule obtaining unit 1701 is configured to obtain a service chain rule, where the service chain rule is used to indicate service processing that needs to be performed; the service chain information obtaining unit 1702 is configured to obtain, according to the service chain rule obtained by the service chain rule obtaining unit 1701, information about a service chain through which a service route passes, where the information about the service chain is used to indicate information about a VNF through which the service route passes, and the VNF is configured for the service processing; and the message sending unit 1703 is configured to send a route and resource configuration request message, where the route and resource configuration request message carries the information about the service chain obtained by the service chain information obtaining unit 1702, to request to perform, according to the information about the service chain, route and resource configuration for the VNF included in the service chain.

Figure 18:
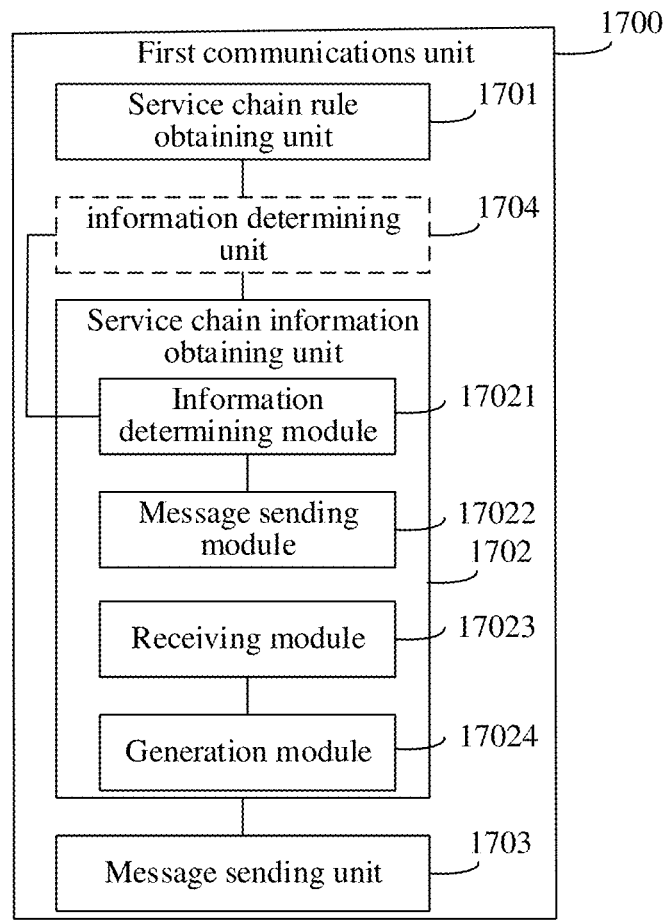
FIG. 18 is a schematic structural diagram of another first communications unit according to an embodiment.

Further, as shown in FIG. 18, the first communications unit 1700 further includes an information determining unit 1704, where the information determining unit 1704 is configured to: before the service chain information obtaining unit 1702 obtains, according to the service chain rule obtained by the service chain rule obtaining unit 1701, the information about the service chain through which the service route passes, determine whether the service chain rule includes the information about the service chain; and the service chain information obtaining unit 1702 includes: an information determining module 17021, a message sending module 17022, a receiving module 17023, and a generation module 17024, where the information determining module 17021 is configured to: if the information determining unit 1704 determines that the service chain rule does not include the information about the service chain, determine, according to the service chain rule, a type of the VNF through which the service route passes and identification information of a VNF included in each VNF type in the type of the VNF; the message sending module 17022 is configured to send a query request message, where the query request message carries the identification information, determined by the information determining module 17021, of the VNF included in each VNF type, to request to query, according to the identification information of the VNF, first information of the VNF included in each VNF type, where the first information is used to indicate a network topology, a node capability, and a status of a network function virtualization infrastructure (NFVI); the receiving module 17023 is configured to receive the first information of the VNF included in each VNF type; and the generation module 17024 is configured to generate the information about the service chain according to the first information, received by the receiving module 17023, of the VNF included in each VNF type.

Figure 19:
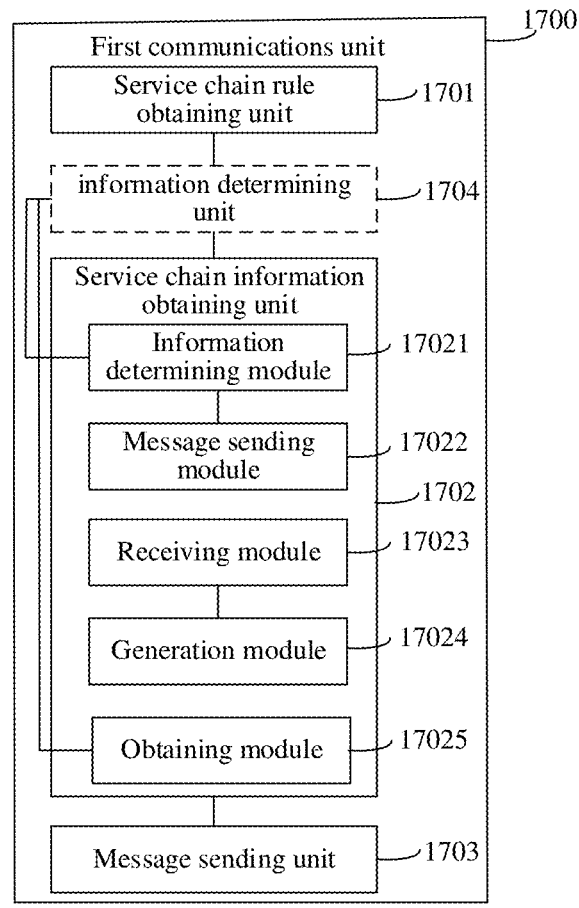
FIG. 19 is a schematic structural diagram of still another first communications unit according to an embodiment.

Further, as shown in FIG. 19, the service chain information obtaining unit 1702 further includes an obtaining module 17025, where the obtaining module 17025 is configured to: if the service chain rule includes the information about the service chain, obtain the information about the service chain included in the service chain rule.

Further, the message sending module 17022 is configured to: send the query request message to a second communications unit, to request the second communications unit to query, according to the identification information of the VNF, the first information of the VNF included in each VNF type.

In a possible implementation manner, the message sending module 17022 is configured to: send the query request message to a VNF manager (VNFM), to send the query request message to the second communications unit by using the VNFM.

Preferably, the message sending module 17022 is configured to: send the query request message to the VNFM, to send the query request message to a NFV orchestrator (NFVO) by using the VNFM and to send the query request message to the second communications unit by using the NFVO.

In another possible implementation manner, the message sending module 17022 is configured to: send the query request message to an operations support system/business support system (OSS/BSS), to send the query request message to an NFVO by using the OSS/BSS and to send the query request message to the second communications unit by using the NFVO.

Preferably, the message sending module 17022 is configured to: send the query request message to the OSS/BSS, to send the query request message to the NFVO by using the OSS/BSS, to send the query request message to a VNFM by using the NFVO, and to send the query request message to the second communications unit by using the VNFM.

Further, the message sending unit 1703 is configured to: send the route and resource configuration request message to the second communications unit, to request the second communications unit to perform the route and resource configuration.

In a possible implementation manner, the message sending unit 1703 is configured to: send the route and resource configuration request message to the VNFM, to send the route and resource configuration request message to the second communications unit by using the VNFM.

Preferably, the message sending unit 1703 is configured to: send the route and resource configuration request message to the VNFM, to send the route and resource configuration request message to the NFVO by using the VNFM and to send the route and resource configuration request message to the second communications unit by using the NFVO.

In another possible implementation manner, the message sending unit 1703 is configured to: send the route and resource configuration request message to the OSS/BSS, to send the route and resource configuration request message to the NFVO by using the OSS/BSS and to send the route and resource configuration request message to the second communications unit by using the NFVO.

Preferably, the message sending unit 1703 is configured to: send the route and resource configuration request message to the OSS/BSS, to send the route and resource configuration request message to the NFVO by using the OSS/BSS, to send the route and resource configuration request message to the VNFM by using the NFVO, and to send the route and resource configuration request message to the second communications unit by using the VNFM.

Figure 20:
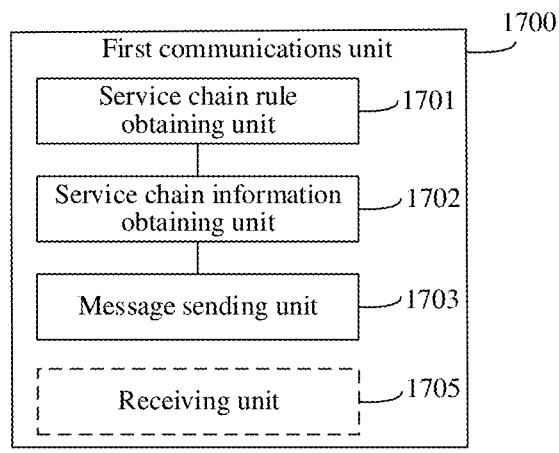
FIG. 20 is a schematic structural diagram of still another first communications unit according to an embodiment.

Further, as shown in FIG. 20, the first communications unit 1700 further includes a receiving unit 1705, where the receiving unit 1705 is configured to: if the route and resource configuration succeeds, receive information indicating that the route and resource configuration succeeds.

In this embodiment, the first communications unit may be a service chain controller, or may be a network node such as a PGW, a PCRF, a TDF, or a traffic classifier, which is not limited in this embodiment. For a related description of the service chain controller, refer to a description of step 301 in Embodiment 1. Details are not repeated herein in this embodiment.

It should be noted that, in this embodiment, the network node such as the PGW, the PCRF, the TDF, or the traffic classifier may be a VNF unit, or may be a PNF unit, which is not limited in this embodiment.

The second communications unit may be a VIM, or may be an NFVI controller, which is not limited in this embodiment. For a related description of the NFVI controller, refer to the part of step 501 in Embodiment 2. Details are not repeated herein in this embodiment.

For the method for service implementation in an NFV system that is performed by the first communications unit, refer to a description of Embodiment 1 or Embodiment 7. Details are not repeated herein in this embodiment.

Based on the first communications unit provided in this embodiment, after obtaining a service chain rule, the first communications unit can obtain, according to the service chain rule, information about a service chain through which a service route passes, and then send a route and configuration request message that carries the information about the service chain, to request to perform, according to the information about the service chain, route and resource configuration for a VNF included in the service chain, implementing a function of obtaining upper-layer information about a service chain and guiding route and resource configuration of an NFVI by using the upper-layer information about a service chain, and implementing establishment of an NFV network service chain.

Embodiment 9

Figure 21:
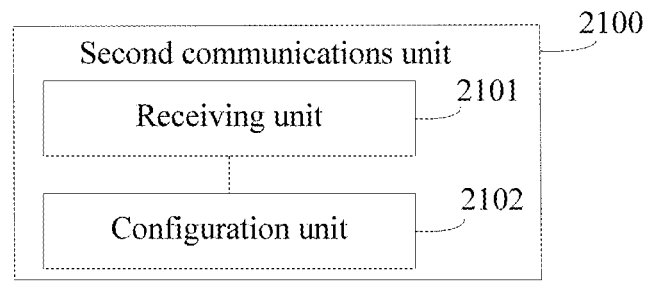
FIG. 21 is a schematic structural diagram of a second communications unit according to an embodiment.

This embodiment provides a second communications unit 2100. As shown in FIG. 21, the second communications unit 2100 includes: a receiving unit 2101 and a configuration unit 2102, where the receiving unit 2101 is configured to receive a route and resource configuration request message, where the route and resource configuration request message carries information about a service chain through which a service route passes, to request to perform, according to the information about the service chain, route and resource configuration for a VNF included in the service chain, where the information about the service chain is obtained according to a service chain rule, the service chain rule is used to indicate service processing that needs to be performed, the information about the service chain is used to indicate information about the VNF through which the service route passes, and the VNF is configured for the service processing; and the configuration unit 2102 is configured to perform, according to the information about the service chain received by the receiving unit 2101 and information about a physical resource of a NFVI, service route and resource configuration for the VNF included in the service chain.

Figure 22:
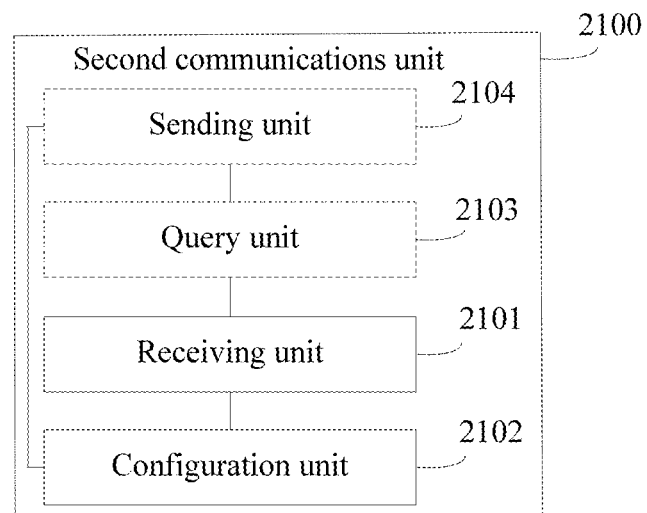
FIG. 22 is a schematic structural diagram of another second communications unit according to an embodiment.

Further, as shown in FIG. 22, the second communications unit 2100 further includes: a query unit 2103 and a sending unit 2104, where the receiving unit 2101 is further configured to: before receiving the route and resource configuration request message, receive a query request message, where the query request message carries identification information of a VNF included in each VNF type in a type of the VNF through which the service route passes, to request to query, according to the identification information of the VNF, first information of the VNF included in each VNF type, where the first information is used to indicate a network topology, a node capability, and a status of the NFVI; the query unit 2103 is configured to: according to the query request message received by the receiving unit 2101, query the physical resource of the NFVI, and obtain the first information of the VNF included in each VNF type; and the sending unit 2104 is configured to send the first information, obtained by the query unit 2103 through query, of the VNF included in each VNF type, to generate the information about the service chain according to the first information of the VNF included in each VNF type.

In a possible implementation manner, the receiving unit 2101 is configured to: receive the route and resource configuration request message sent by a VNFM.

In another possible implementation manner, the receiving unit 2101 is configured to: receive the route and resource configuration request message sent by a VNF OSS/BSS.

Further, the sending unit 2104 is further configured to: if the route and resource configuration succeeds, send information indicating that the route and resource configuration succeeds.

In this embodiment, the second communications unit may be a VIM, or may be an NFVI controller, which is not limited in this embodiment. For a related description of the NFVI controller, refer to the part of step 501 in Embodiment 2. Details are not repeated herein in this embodiment.

For the method for service implementation in an NFV system that is performed by the second communications unit, refer to a description of Embodiment 2 or Embodiment 7. Details are not repeated herein in this embodiment.

Based on the second communications unit provided in this embodiment, the second communications unit can receive a route and resource configuration request message, where the route and resource configuration request message carries information about a service chain through which a service route passes, to request to perform, according to the information about the service chain, route and resource configuration for a VNF included in the service chain; and then perform, according to the information about the service chain and information about a physical resource of an NFVI, service route and resource configuration for the VNF included in the service chain, implementing a function of obtaining upper-layer information about a service chain and guiding route and resource configuration of the NFVI by using the upper-layer information about a service chain, and implementing establishment of an NFV network service chain.

Embodiment 10

Figure 23:
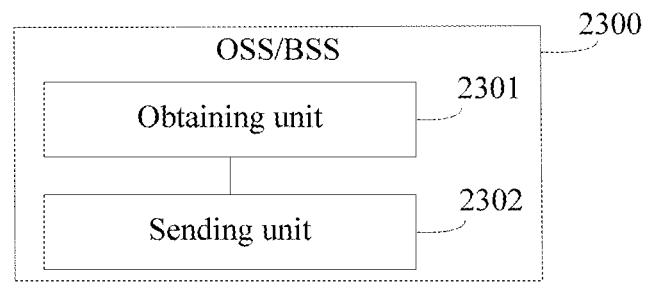
FIG. 23 is a schematic structural diagram of an operations support system/business support system (OSS/BSS) according to an embodiment.

This embodiment provides an OSS/BSS 2300. As shown in FIG. 23, the OSS/BSS 2300 includes: an obtaining unit 2301 and a sending unit 2302, where the obtaining unit 2301 is configured to obtain information about a service chain template through which a service route passes, where the service chain template information is used to indicate a correspondence between a service chain identifier and information about a service chain; and the sending unit 2302 is configured to send the service chain template information obtained by the obtaining unit 2301 to an NFV orchestrator NFVO, so that the NFVO requests, according to the service chain template information, to perform route and resource configuration for a VNF included in a service chain in the service chain template.

Figure 24:
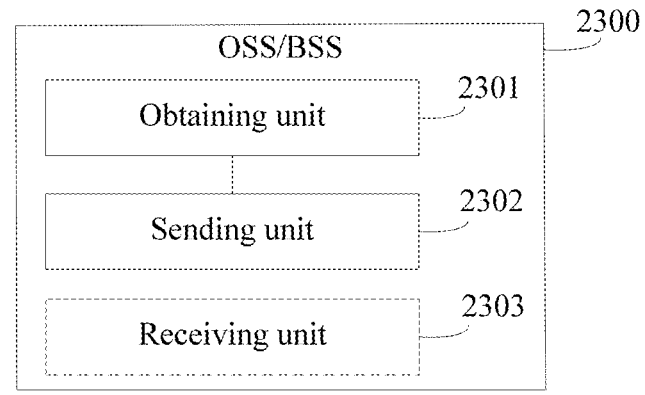
FIG. 24 is a schematic structural diagram of another OSS/BSS according to an embodiment.

Further, as shown in FIG. 24, the OSS/BSS 2300 further includes a receiving unit 2303, where the receiving unit 2303 is configured to receive information indicating that the service chain template information has been received.

Further, the receiving unit 2303 is further configured to: if the route and resource configuration succeeds, receive information indicating that the route and resource configuration succeeds.

For the method for service implementation in an NFV system that is performed by the OSS/BSS, refer to a description of Embodiment 3 or Embodiment 6. Details are not repeated herein in this embodiment.

Based on the OSS/BSS provided in this embodiment, the OSS/BSS obtains information about a service chain template through which a service route passes, where the service chain template information is used to indicate a correspondence between a service chain identifier and information about a service chain; and sends the service chain template information to an NFVO, so that the NFVO requests, according to the service chain template information, to perform route and resource configuration for a VNF included in a service chain in the service chain template, implementing a function of obtaining upper-layer information about a service chain and guiding route and resource configuration of an NFVI by using the upper-layer information about a service chain, and implementing establishment of an NFV network service chain.

Embodiment 11

Figure 25:
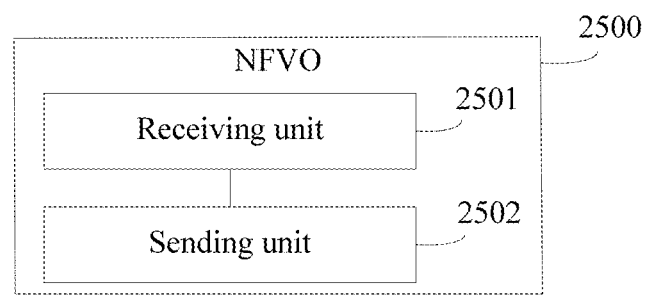
FIG. 25 is a schematic structural diagram of an NFVO according to an embodiment.

This embodiment provides a NFVO 2500. As shown in FIG. 25, the NFVO 2500 includes: a receiving unit 2501 and a sending unit 2502, where the receiving unit 2501 is configured to receive information about a service chain template through which a service route passes, where the service chain template information is used to indicate a correspondence between a service chain identifier and information about a service chain; and the sending unit 2502 is configured to send a route and resource configuration request message, where the route and resource configuration request message carries the service chain template information received by the receiving unit 2501, to request to perform, according to the service chain template information, route and resource configuration for a VNF included in a service chain in the service chain template.

The sending unit 2502 may be configured to: send the route and resource configuration request message to a second communications unit, to request the second communications unit to perform, according to the service chain template information, the route and resource configuration for the VNF included in the service chain in the service chain template.

Further, the sending unit 2502 is further configured to: after the receiving unit 2501 receives the information about the service chain template through which the service route passes, send information indicating that the service chain template information has been received.

Further, the receiving unit 2501 is further configured to: if the route and resource configuration succeeds, receive information indicating that the route and resource configuration succeeds.

In this embodiment, the second communications unit may be a VIM, or may be an NFVI controller, which is not limited in this embodiment. For a related description of the NFVI controller, refer to the part of step 501 in Embodiment 2. Details are not repeated herein in this embodiment.

For the method for service implementation in an NFV system that is performed by the NFVO, refer to a description of Embodiment 4 or Embodiment 6. Details are not repeated herein in this embodiment.

Based on the NFVO provided in this embodiment, the NFVO can receive information about a service chain template through which a service route passes, where the service chain template information is used to indicate a correspondence between a service chain identifier and information about a service chain; and then send a route and resource configuration request message, where the route and resource configuration request message carries the service chain template information, to request to perform, according to the service chain template information, route and resource configuration for a VNF included in a service chain in the service chain template, implementing a function of obtaining upper-layer information about a service chain and guiding route and resource configuration of an NFVI by using the upper-layer information about a service chain, and implementing establishment of an NFV network service chain.

Embodiment 12

Figure 26:
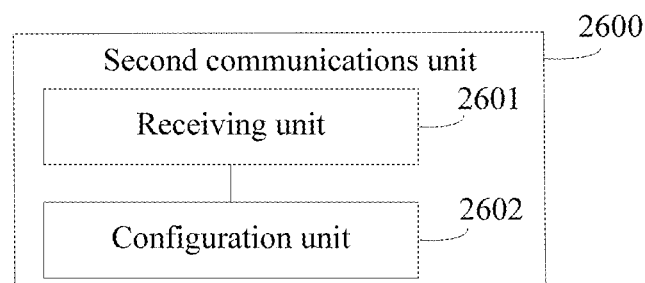
FIG. 26 is a schematic structural diagram of a second communications unit according to an embodiment.

This embodiment provides a second communications unit 2600. As shown in FIG. 26, the second communications unit 2600 includes: a receiving unit 2601 and a configuration unit 2602, where the receiving unit 2601 is configured to receive a route and resource configuration request message, where the route and resource configuration request message carries information about a service chain template through which a service route passes, to request to perform, according to the service chain template information, route and resource configuration for a VNF included in a service chain in the service chain template, where the service chain template information is used to indicate a correspondence between a service chain identifier and information about a service chain; and the configuration unit 2602 is configured to perform, according to the service chain template information received by the receiving unit 2601 and information about a physical resource of a NFVI, the route and resource configuration for the VNF included in the service chain in the service chain template.

The receiving unit 2601 may be configured to: receive the route and resource configuration request message sent by an NFV orchestrator NFVO.

Figure 27:
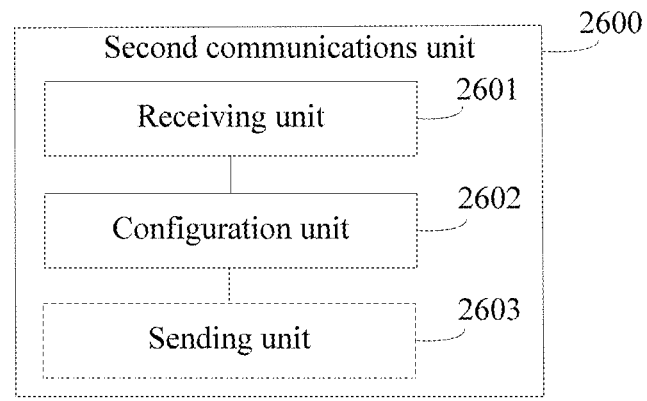
FIG. 27 is a schematic structural diagram of another second communications unit according to an embodiment.

Further, as shown in FIG. 27, the second communications unit 2600 further includes a sending unit 2603, where the sending unit 2603 is configured to: if the route and resource configuration succeeds, send information indicating that the route and resource configuration succeeds.

In this embodiment, the second communications unit may be a VIM, or may be an NFVI controller, which is not limited in this embodiment. For a related description of the NFVI controller, refer to the part of step 501 in Embodiment 2. Details are not repeated herein in this embodiment.

For the method for service implementation in an NFV system that is performed by the second communications unit, refer to a description of Embodiment 5 or Embodiment 6. Details are not repeated herein in this embodiment.

Based on the second communications unit provided in this embodiment, the second communications unit receives a route and resource configuration request message, where the route and resource configuration request message carries information about a service chain template through which a service route passes, to request to perform, according to the service chain template information, route and resource configuration for a VNF included in the service chain in the service chain template; and then performs, according to the service chain template information and information about a physical resource of an NFVI, the route and resource configuration for the VNF included in the service chain in the service chain template, implementing a function of obtaining upper-layer information about a service chain and guiding route and resource configuration of the NFVI by using the upper-layer information about a service chain, and implementing establishment of an NFV network service chain.

Embodiment 13

Figure 28:
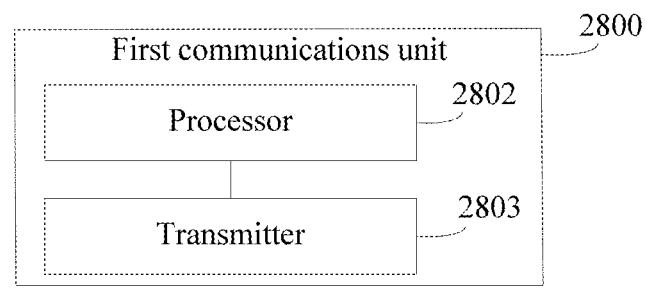
FIG. 28 is a schematic structural diagram of a first communications unit according to an embodiment.

This embodiment provides a first communications unit 2800. As shown in FIG. 28, the first communications unit 2800 includes: a processor 2802 and a transmitter 2803, where the processor 2802 is configured to obtain a service chain rule, where the service chain rule is used to indicate service processing that needs to be performed; the processor 2802 is further configured to obtain, according to the service chain rule, information about a service chain through which a service route passes, where the information about the service chain is used to indicate information about a VNF through which the service route passes, and the VNF is configured for the service processing; and the transmitter 2803 is configured to send a route and resource configuration request message, where the route and resource configuration request message carries the information about the service chain obtained by the processor 2802, to request to perform, according to the information about the service chain, route and resource configuration for the VNF included in the service chain.

Further, the processor 2802 is further configured to: before obtaining, according to the service chain rule, the information about the service chain through which the service route passes, determine whether the service chain rule includes the information about the service chain; and the processor 2802 being further configured to obtain, according to the service chain rule, information about a service chain through which a service route passes includes: if the service chain rule does not include the information about the service chain, determining, according to the service chain rule, a type of the VNF through which the service route passes and identification information of a VNF included in each VNF type in the type of the VNF; sending a query request message, where the query request message carries the identification information of the VNF included in each VNF type, to request to query, according to the identification information of the VNF, first information of the VNF included in each VNF type, where the first information is used to indicate a network topology, a node capability, and a status of a NFVI; receiving the first information of the VNF included in each VNF type; and generating the information about the service chain according to the first information of the VNF included in each VNF type.

Further, the processor 2802 being configured to obtain, according to the service chain rule, information about a service chain through which a service route passes further includes:

if the service chain rule includes the information about the service chain, obtaining the information about the service chain included in the service chain rule.

The sending, by the processor 2802, a query request message may include: sending the query request message to a second communications unit, to request the second communications unit to query, according to the identification information of the VNF, the first information of the VNF included in each VNF type.

In a possible implementation manner, the sending, by the processor 2802, a query request message includes: sending the query request message to a VNFM, to send the query request message to the second communications unit by using the VNFM.

Preferably, the sending, by the processor 2802, a query request message includes: sending the query request message to the VNFM, to send the query request message to a NFVO by using the VNFM and to send the query request message to the second communications unit by using the NFVO.

In a possible implementation manner, the sending, by the processor 2802, a query request message includes: sending the query request message to an OSS/BSS, to send the query request message to an NFVO by using the OSS/BSS and to send the query request message to the second communications unit by using the NFVO.

Preferably, the sending, by the processor 2802, a query request message includes: sending the query request message to the OSS/BSS, to send the query request message to the NFVO by using the OSS/BSS, to send the query request message to a VNFM by using the NFVO, and to send the query request message to the second communications unit by using the VNFM.

Further, the transmitter 2803 is configured to: send the route and resource configuration request message to the second communications unit, to request the second communications unit to perform the route and resource configuration.

In a possible implementation manner, the transmitter 2803 is configured to: send the route and resource configuration request message to the VNFM, to send the route and resource configuration request message to the second communications unit by using the VNFM.

Preferably, the transmitter 2803 is configured to: send the route and resource configuration request message to the VNFM, to send the route and resource configuration request message to the NFVO by using the VNFM and to send the route and resource configuration request message to the second communications unit by using the NFVO.

In another possible implementation manner, the transmitter 2803 is configured to:

send the route and resource configuration request message to the OSS/BSS, to send the route and resource configuration request message to the NFVO by using the OSS/BSS and to send the route and resource configuration request message to the second communications unit by using the NFVO.

Preferably, the transmitter 2803 is configured to: send the route and resource configuration request message to the OSS/BSS, to send the route and resource configuration request message to the NFVO by using the OSS/BSS, to send the route and resource configuration request message to the VNFM by using the NFVO, and to send the route and resource configuration request message to the second communications unit by using the VNFM.

Figure 29:
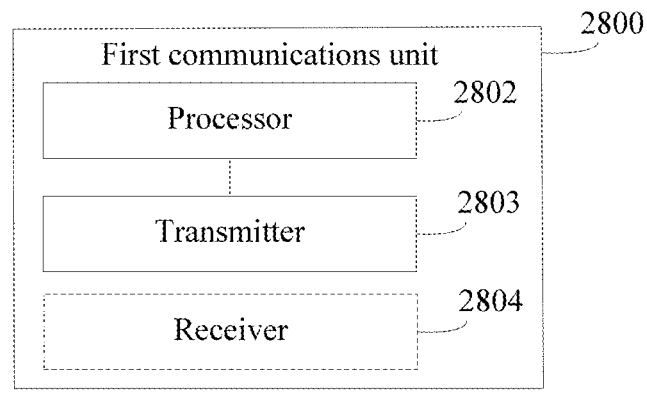
FIG. 29 is a schematic structural diagram of another first communications unit according to an embodiment.

Further, as shown in FIG. 29, the first communications unit 2800 further includes a receiver 2804, where the receiver 2804 is configured to: if the route and resource configuration succeeds, receive information indicating that the route and resource configuration succeeds.

In this embodiment, the first communications unit may be a service chain controller, or may be a network node such as a PGW, a PCRF, a TDF, or a traffic classifier, which is not limited in this embodiment. For a related description of the service chain controller, refer to a description of step 301 in Embodiment 1. Details are not repeated herein in this embodiment.

It should be noted that, in this embodiment, the network node such as the PGW, the PCRF, the TDF, or the traffic classifier may be a VNF unit, or may be a PNF unit, which is not limited in this embodiment.

The second communications unit may be a VIM, or may be an NFVI controller, which is not limited in this embodiment. For a related description of the NFVI controller, refer to the part of step 501 in Embodiment 2. Details are not repeated herein in this embodiment.

For the method for service implementation in an NFV system that is performed by the first communications unit, refer to a description of Embodiment 1 or Embodiment 7. Details are not repeated herein in this embodiment.

Based on the first communications unit provided in this embodiment, after obtaining a service chain rule, the first communications unit can obtain, according to the service chain rule, information about a service chain through which a service route passes, and then send a route and configuration request message that carries the information about the service chain, to request to perform, according to the information about the service chain, route and resource configuration for a VNF included in the service chain, implementing a function of obtaining upper-layer information about a service chain and guiding route and resource configuration of an NFVI by using the upper-layer information about a service chain, and implementing establishment of an NFV network service chain.

Embodiment 14

Figure 30:
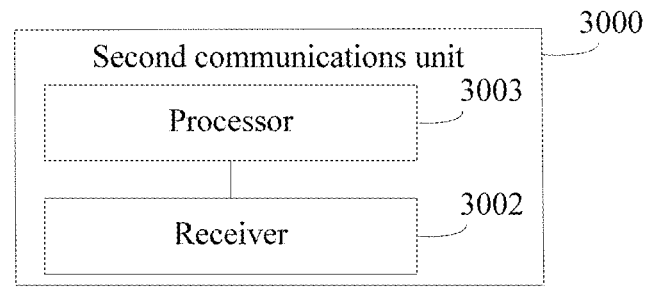
FIG. 30 is a schematic structural diagram of a second communications unit according to an embodiment.

This embodiment provides a second communications unit 3000. As shown in FIG. 30, the second communications unit 3000 includes: a receiver 3002 and a processor 3003, where the receiver 3002 is configured to receive a route and resource configuration request message, where the route and resource configuration request message carries information about a service chain through which a service route passes, to request to perform, according to the information about the service chain, route and resource configuration for a VNF included in the service chain, where the information about the service chain is obtained according to a service chain rule, the service chain rule is used to indicate service processing that needs to be performed, the information about the service chain is used to indicate information about the VNF through which the service route passes, and the VNF is configured for the service processing; and the processor 3003 is configured to perform, according to the information about the service chain received by the receiver 3002 and information about a physical resource of a NFVI, service route and resource configuration for the VNF included in the service chain.

Figure 31:
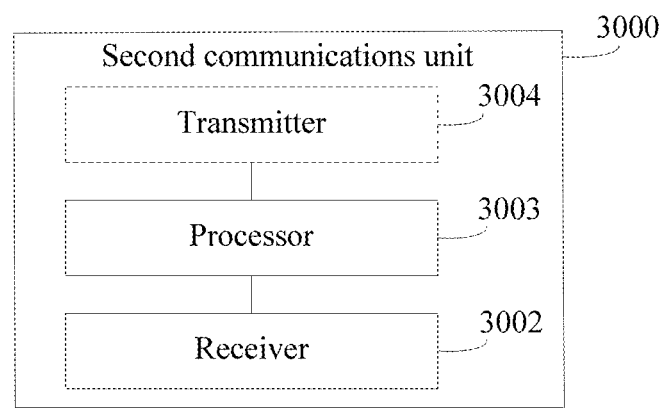
FIG. 31 is a schematic structural diagram of another second communications unit according to an embodiment.

Further, as shown in FIG. 31, the second communications unit 3000 further includes: a transmitter 3004, where the receiver 3002 is further configured to: before receiving the route and resource configuration request message, receive a query request message, where the query request message carries identification information of a VNF included in each VNF type in a type of the VNF through which the service route passes, to request to query, according to the identification information of the VNF, first information of the VNF included in each VNF type, where the first information is used to indicate a network topology, a node capability, and a status of the NFVI; the processor 3003 is further configured to: according to the query request message received by the receiver 3002, query the physical resource of the NFVI, and obtain the first information of the VNF included in each VNF type; and the transmitter 3004 is configured to send the first information, obtained by the processor 3003 through query, of the VNF included in each VNF type, to generate the information about the service chain according to the first information of the VNF included in each VNF type.

In a possible implementation manner, the receiver 3002 may be configured to: receive the route and resource configuration request message sent by a VNFM.

In another possible implementation manner, the receiver 3002 is configured to: receive the route and resource configuration request message sent by a VNF OSS/BSS.

Further, the transmitter 3004 is further configured to: if the route and resource configuration succeeds, send information indicating that the route and resource configuration succeeds.

In this embodiment, the second communications unit may be a VIM, or may be an NFVI controller, which is not limited in this embodiment. For a related description of the NFVI controller, refer to the part of step 501 in Embodiment 2. Details are not repeated herein in this embodiment.

For the method for service implementation in an NFV system that is performed by the second communications unit, refer to a description of Embodiment 2 or Embodiment 7. Details are not repeated herein in this embodiment.

Based on the second communications unit provided in this embodiment, the second communications unit can receive a route and resource configuration request message, where the route and resource configuration request message carries information about a service chain through which a service route passes, to request to perform, according to the information about the service chain, route and resource configuration for a VNF included in the service chain; and then perform, according to the information about the service chain and information about a physical resource of an NFVI, service route and resource configuration for the VNF included in the service chain, implementing a function of obtaining upper-layer information about a service chain and guiding route and resource configuration of the NFVI by using the upper-layer information about a service chain, and implementing establishment of an NFV network service chain.

Embodiment 15

Figure 32:
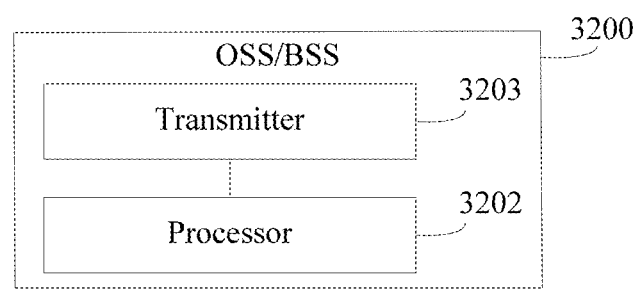
FIG. 32 is a schematic structural diagram of an OSS/BSS according to an embodiment.

This embodiment provides an 3200. As shown in FIG. 32, the OSS/BSS 3200 includes: a processor 3202 and a transmitter 3203, where the processor 3202 is configured to obtain information about a service chain template through which a service route passes, where the service chain template information is used to indicate a correspondence between a service chain identifier and information about a service chain; and the transmitter 3203 is configured to send the service chain template information obtained by the processor 3202 to an NFV orchestrator NFVO, so that the NFVO requests, according to the service chain template information, to perform route and resource configuration for a VNF included in a service chain in the service chain template.

Figure 33:
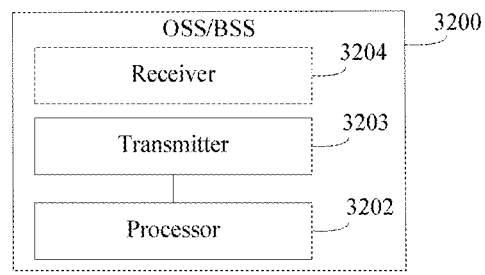
FIG. 33 is a schematic structural diagram of another OSS/BSS according to an embodiment.

Further, as shown in FIG. 33, the OSS/BSS 3200 further includes a receiver 3204, where the receiver 3204 is configured to receive information indicating that the service chain template information has been received.

Further, the receiver 3204 is further configured to: if the route and resource configuration succeeds, receive information indicating that the route and resource configuration succeeds.

For the method for service implementation in an NFV system that is performed by the OSS/BSS, refer to a description of Embodiment 3 or Embodiment 6. Details are not repeated herein in this embodiment.

Based on the OSS/BSS provided in this embodiment, the OSS/BSS obtains information about a service chain template through which a service route passes, where the service chain template information is used to indicate a correspondence between a service chain identifier and information about a service chain; and sends the service chain template information to an NFVO, so that the NFVO requests, according to the service chain template information, to perform route and resource configuration for a VNF included in a service chain in the service chain template, implementing a function of obtaining upper-layer information about a service chain and guiding route and resource configuration of an NFVI by using the upper-layer information about a service chain, and implementing establishment of an NFV network service chain.

Embodiment 16

Figure 34:
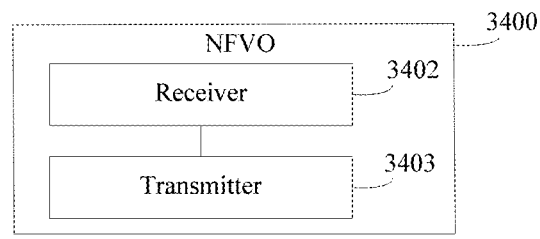
FIG. 34 is a schematic structural diagram of an NFVO according to an embodiment.

This embodiment provides a NFVO 3400. As shown in FIG. 34, the NFVO 3400 includes: a receiver 3402 and a transmitter 3403, where the receiver 3402 is configured to receive information about a service chain template through which a service route passes, where the service chain template information is used to indicate a correspondence between a service chain identifier and information about a service chain; and the transmitter 3403 is configured to send a route and resource configuration request message, where the route and resource configuration request message carries the service chain template information received by the receiver 3402, to request to perform, according to the service chain template information, route and resource configuration for a VNF included in a service chain in the service chain template.

The transmitter 3403 may be configured to: send the route and resource configuration request message to a second communications unit, to request the second communications unit to perform, according to the service chain template information, the route and resource configuration for the VNF included in the service chain in the service chain template.

Further, the transmitter 3403 is further configured to: after the receiver 3402 receives the information about the service chain template through which the service route passes, send information indicating that the service chain template information has been received.

Further, the receiver 3402 is further configured to: if the route and resource configuration succeeds, receive information indicating that the route and resource configuration succeeds.

In this embodiment, the second communications unit may be a VIM, or may be an NFVI controller, which is not limited in this embodiment. For a related description of the NFVI controller, refer to the part of step 501 in Embodiment 2. Details are not repeated herein in this embodiment.

For the method for service implementation in an NFV system that is performed by the NFVO, refer to a description of Embodiment 4 or Embodiment 6. Details are not repeated herein in this embodiment.

Based on the NFVO provided in this embodiment, the NFVO can receive information about a service chain template through which a service route passes, where the service chain template information is used to indicate a correspondence between a service chain identifier and information about a service chain; and then send a route and resource configuration request message, where the route and resource configuration request message carries the service chain template information, to request to perform, according to the service chain template information, route and resource configuration for a VNF included in a service chain in the service chain template, implementing a function of obtaining upper-layer information about a service chain and guiding route and resource configuration of an NFVI by using the upper-layer information about a service chain, and implementing establishment of an NFV network service chain.

Embodiment 17

Figure 35:
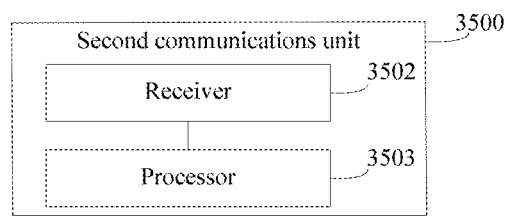
FIG. 35 is a schematic structural diagram of a second communications unit according to an embodiment.

This embodiment provides a second communications unit 3500. As shown in FIG. 35, the second communications unit includes: a receiver 3502 and a processor 3503, where the receiver 3502 is configured to receive a route and resource configuration request message, where the route and resource configuration request message carries information about a service chain template through which a service route passes, to request to perform, according to the service chain template information, route and resource configuration for a VNF included in a service chain in the service chain template, where the service chain template information is used to indicate a correspondence between a service chain identifier and information about a service chain; and the processor 3503 is configured to perform, according to the service chain template information received by the receiver 3502 and information about a physical resource of a NFVI, the route and resource configuration for the VNF included in the service chain in the service chain template.

The transmitter 3502 may be configured to: receive the route and resource configuration request message sent by an NFV orchestrator NFVO.

Figure 36:
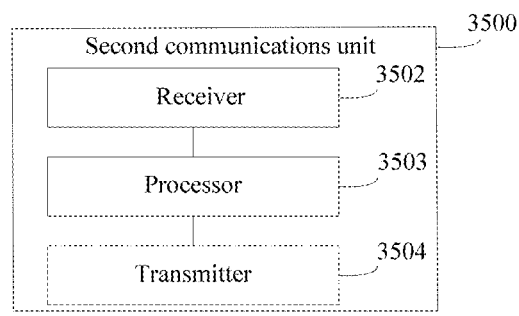
FIG. 36 is a schematic structural diagram of another second communications unit according to an embodiment.

Further, as shown in FIG. 36, the second communications unit 3500 further includes a transmitter 3504, where the transmitter 3504 is configured to: if the route and resource configuration succeeds, send information indicating that the route and resource configuration succeeds.

In this embodiment, the second communications unit may be a VIM, or may be an NFVI controller, which is not limited in this embodiment. For a related description of the NFVI controller, refer to the part of step 501 in Embodiment 2. Details are not repeated herein in this embodiment.

For the method for service implementation in an NFV system that is performed by the second communications unit, refer to a description of Embodiment 5 or Embodiment 6. Details are not repeated herein in this embodiment.

Based on the second communications unit provided in this embodiment, the second communications unit receives a route and resource configuration request message, where the route and resource configuration request message carries information about a service chain template through which a service route passes, to request to perform, according to the service chain template information, route and resource configuration for a VNF included in the service chain in the service chain template; and then performs, according to the service chain template information and information about a physical resource of an NFVI, the route and resource configuration for the VNF included in the service chain in the service chain template, implementing a function of obtaining upper-layer information about a service chain and guiding route and resource configuration of the NFVI by using the upper-layer information about a service chain, and implementing establishment of an NFV network service chain.

It may be clearly understood by a person skilled in the art that, for the purpose of convenient and brief description, division of the foregoing functional modules is taken as an example for illustrating the apparatus described above. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners, but are not intended to limit the protection scope. Any variation or replacement readily figured out by a person skilled in the art within the technical scope disclosed shall fall within the protection scope. Therefore, the protection scope shall be subject to the protection scope of the claims.

What is claimed is:

1. An network communication apparatus, comprising:
a processor; and
a non-transitory computer readable storage medium storing a program for execution by the processor, the program including instructions to:
obtain service chain template information, wherein a service route passes through a service chain template, and wherein the service chain template information indicates a correspondence between a service chain identifier and information about a service chain, wherein the information about the service chain indicates virtualized network functions (VNFs) included in the service chain and a sequence of the VNFs; and
send the service chain template information to a network function virtualization (NFV) orchestrator (NFVO), triggering the NFVO to request a second communications apparatus to configure routing information based on the service chain template information and physical resources of a NFV infrastructure (NFVI) apparatus making a service stream that corresponds to the service chain routed according to the sequence of the VNFs and the routing information, to determine routing devices of the NFVI apparatus that corresponds to the VNFs for routing the service stream, and to send a service route information table comprising the routing information to the routing devices of the NFVI apparatus; and
wherein the network communication apparatus is in an operations support system/business support system (OSS/BSS).

2. The OSS/BSS according to claim 1, wherein the instructions further comprise instructions to:
receive information indicating that the service link template information has been received.

3. The network communication apparatus according to claim 1, wherein the instructions further comprise instructions to:
receive information indicating that configuring the routing information has succeeded.

4. An network communications apparatus comprising:
a processor; and
a non-transitory computer readable storage medium storing a program for execution by the processor, the program including instructions to:
receive service chain template information, wherein a service route passes through a service chain template, and wherein the service chain template information indicates a correspondence between a service chain identifier and information about a service chain, wherein the information about the service chain indicates virtualized network functions (VNFs) included in the service chain and a sequence of the VNFs; and
send, upon receipt of the service chain template information, a route and resource configuration request message to a second communications apparatus to request the second communications apparatus to configure routing information based on the service chain template information and physical resources of a NFV infrastructure (NFVI) apparatus, making a service stream that corresponds to the service chain route according to the sequence of the VNFs and the routing information, to determine routing devices of the NFVI apparatus that correspond to the VNFs for routing the service stream, and to send a service route information table comprising the routing information to the routing devices of the NFVI apparatus, wherein the route and resource configuration request message includes the service chain template information, and wherein the network communication apparatus is in a network function virtualization orchestrator (NFVO).

5. The NFVO according to claim 4, wherein the instructions further comprise instructions to:

send information indicating that the service link template information has been received in response to receiving the information about the service link template.

6. The NFVO according to claim 4, wherein the instructions further comprise instructions to:
receive information indicating that the route and resource configuration has succeeded in response to the route and resource configuration succeeding.

7. A method comprising:
obtaining, by an operations support system/business support system (OSS/BSS), service chain template information, wherein a service route passes through a service chain template, and wherein the service chain template information indicates a correspondence between a service chain identifier and information about a service chain, wherein the information about the service chain indicates virtualized network functions (VNFs) included in the service chain and a sequence of the VNFs; and
sending the service chain template information to a network function virtualization (NFV) orchestrator (NFVO), triggering the NFVO to request a second communications apparatus to configure routing information based on the service chain template information and physical resources of a NFV infrastructure (NFVI) apparatus, making a service stream that corresponds to the service chain routed according to a sequence of the VNFs and the routing information, to determine routing devices of the NFVI apparatus that correspond to the VNFs for routing the service stream, and to send a service route information table comprising the routing information to the routing devices of the NFVI apparatus.

8. The method according to claim 7, wherein the method further comprises:
receiving information indicating that the service link template information has been received.

9. The method according to claim 7, wherein the method further comprises:
receiving information indicating that the route and resource configuration has succeeded in response to the route and resource configuration succeeding.

10. The method according to claim 9, further comprising sending, by the OSS/BSS to a communications unit, the information indicating that the route and resource unit has succeeded.

11. The method according to claim 7, wherein obtaining information about the service link template comprises receiving, by the OSS/BSS from a communications unit, a route and resource configuration request message.

12. A method comprising:
receiving, by a network function virtualization (NFV) orchestrator (NFVO), service chain template information, wherein a service route passes through a service chain template, and wherein the service chain template information indicates a correspondence between a service chain identifier and information about a service chain, wherein the information about the service chain indicates virtualized network functions (VNFs) included in the service chain and a sequence of the VNFs; and
sending, upon receipt of the service chain template information, a route and resource configuration request message to a second communications apparatus to request the second communications apparatus to configure routing information based on the service chain template information and physical resources of a NFV infrastructure (NFVI) apparatus, making a service stream that corresponds to the service chain routed according to the sequence of the VNFs and the routing information, to determine routing devices of the NFVI apparatus that correspond to the VNFs for routing the service stream, and to send a service route information table comprising the routing information to the routing devices of the NFVI apparatus, wherein the route and resource configuration request message includes the service chain template information.

13. The method according to claim 12, further comprising:
sending information indicating that the service link template information has been received in response to receiving, by an NFVO, information about the service link template.

14. The method according to of claim 12, wherein the method further comprises:
receiving information indicating that the route and resource configuration has succeeded in response to the route and resource configuration succeeding.

15. The method of claim 14, further comprising sending, by the NFVO to a communications unit, the information indicating that the route and resource configuration has succeeded.

* * * * *